(12) United States Patent
Yamamoto et al.

(10) Patent No.: US 8,134,909 B2
(45) Date of Patent: Mar. 13, 2012

(54) OPTICAL INFORMATION STORAGE MEDIUM, OPTICAL INFORMATION STORAGE MEDIUM PLAYBACK APPARATUS, METHOD OF CONTROLLING OPTICAL INFORMATION STORAGE MEDIUM PLAYBACK APPARATUS, CONTROL PROGRAM OF OPTICAL INFORMATION STORAGE MEDIUM PLAYBACK APPARATUS, AND STORAGE MEDIUM STORING THE PROGRAM THEREIN

(75) Inventors: Masaki Yamamoto, Osaka (JP); Hirohisa Yamada, Osaka (JP); Toshihiko Sakai, Osaka (JP); Yasuhiro Harada, Osaka (JP); Go Mori, Osaka (JP); Hideharu Tajima, Osaka (JP); Nobuyuki Takamori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/452,537

(22) PCT Filed: Jul. 8, 2008

(86) PCT No.: PCT/JP2008/062356
§ 371 (c)(1),
(2), (4) Date: Jan. 6, 2010

(87) PCT Pub. No.: WO2009/008434
PCT Pub. Date: Jan. 15, 2009

(65) Prior Publication Data
US 2010/0118672 A1    May 13, 2010

(30) Foreign Application Priority Data
Jul. 10, 2007    (JP) ................................. 2007-181429

(51) Int. Cl.
*G11B 7/00*    (2006.01)

(52) U.S. Cl. .................... 369/275.3; 369/285; 369/47.49
(58) Field of Classification Search .................... None
See application file for complete search history.

(56) References Cited

U.S. PATENT DOCUMENTS
5,617,400 A    4/1997    Fuji
(Continued)

FOREIGN PATENT DOCUMENTS
| JP | 6-162564 A | 6/1994 |
| JP | 7-73506 A | 3/1995 |
| JP | 7-153119 | 6/1995 |
| JP | 8-63817 A | 3/1996 |

(Continued)

OTHER PUBLICATIONS

English version on International Search Report for PCT/JP2008/062356.

*Primary Examiner* — Joseph Haley
(74) *Attorney, Agent, or Firm* — Edwards Wildman Palmer LLP; David G. Conlin; Stephen D. LeBarron

(57) ABSTRACT

A super resolution medium (1) is provided with an information signal region (11) where a content, such as a video or audio content, is recorded and a test read region (12) where reproduction setting value adjustment information is recorded for adjusting a setting value for reproduction. A shortest mark length on a first prepit row formed in the information signal region (11) is shorter than a length of an optical system resolution limit of a playback apparatus. The types of mark lengths, recorded in the test read region (12), on the second prepit row for adjusting the setting value are the same as part or all types of mark lengths on the first prepit row. Further, the second prepit row includes a prepit having a mark length shorter than the length of the optical system resolution limit of the payback apparatus. Still further, each of the first and second prepit rows has at least three types of mark lengths. With this arrangement, optimum reproduction can be performed for each medium in the super resolution medium (1).

8 Claims, 8 Drawing Sheets

U.S. PATENT DOCUMENTS

| | | |
|---|---|---|
| 6,459,669 B1 | 10/2002 | Fujita et al. |
| 2003/0185122 A1 | 10/2003 | Akiyama et al. |
| 2005/0190670 A1* | 9/2005 | Kim et al. ............... 369/47.5 |
| 2007/0117046 A1 | 5/2007 | Tomiyama et al. |
| 2007/0140083 A1* | 6/2007 | Bae et al. ............... 369/47.53 |
| 2007/0177473 A1* | 8/2007 | Bae et al. ............... 369/47.53 |
| 2007/0274185 A1* | 11/2007 | Kikukawa et al. ........ 369/59.1 |

FOREIGN PATENT DOCUMENTS

| | | |
|---|---|---|
| JP | 2003-173579 A | 6/2003 |
| JP | 2004-005916 A | 1/2004 |
| JP | 2005-332462 A | 12/2005 |
| WO | 99/53489 A1 | 10/1999 |
| WO | WO2004/090882 A1 | 10/2004 |

* cited by examiner

F I G. 2
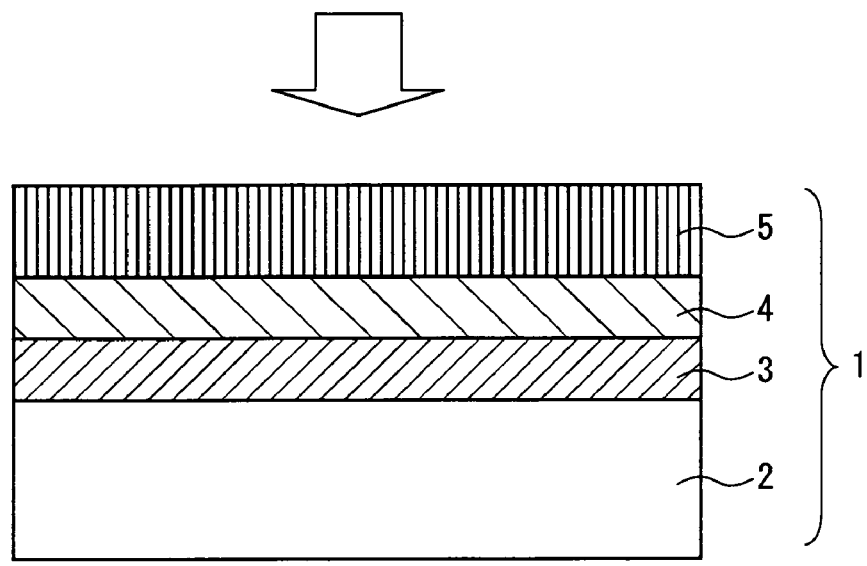

OPTICAL INFORMATION STORAGE MEDIUM, OPTICAL INFORMATION STORAGE MEDIUM PLAYBACK APPARATUS, METHOD OF CONTROLLING OPTICAL INFORMATION STORAGE MEDIUM PLAYBACK APPARATUS, CONTROL PROGRAM OF OPTICAL INFORMATION STORAGE MEDIUM PLAYBACK APPARATUS, AND STORAGE MEDIUM STORING THE PROGRAM THEREIN

CROSS-REFERENCE TO RELATED APPLICATIONS

This application is the National Stage of PCT/JP2008/062356, filed Jul. 8, 2008, which claims the benefit of Japanese Application 181429/2007, filed Jul. 10, 2007. The entire contents of each of these applications is incorporated herein by reference.

TECHNICAL FIELD

The present invention relates to an optical information storage medium in which information is recorded, an optical information storage medium playback apparatus, a method of controlling an optical information storage medium playback apparatus, a control program of an optical information storage medium playback apparatus, and a storage medium storing the program therein.

BACKGROUND ART

In recent years, there has been demand for increase in information density of an optical information storage medium at the recording and playback thereof so that an enormous amount of information, such as video, is processed at high speed. In view of this, a super resolution technology has been proposed in which information is recorded in the form of a row of recording marks or prepits, having a shortest mark length shorter than an optical system resolution limit (hereinafter simply referred to as "resolution limit") of a playback apparatus, and the recorded information is reproduced.

Note that the prepit herein is made up of a concavity and/or a convexity. Further, an optical information storage medium that can be played back by the super resolution technology is referred to as "super resolution medium" or "super resolution optical information storage medium". An optical information storage medium that can be played back without use of the super resolution technology, i.e. an optical information storage medium where information is recorded in the form of a row of recording marks or prepits, having a shortest mark length longer than a resolution limit of a playback apparatus is referred to as "normal medium" or "normal optical information storage medium". Note that the resolution limit, which is determined by a wavelength $\lambda$ of reproduction laser light of the playback apparatus and a numerical aperture NA of an objective lens of the playback apparatus, is theoretically represented by $\lambda/4NA$.

Especially desired is the development of a super resolution technology which is applied mainly to a read-only optical information storage medium and in which information is recorded in the form of a row of prepits, having a shortest mark length shorter than the resolution limit of the playback apparatus and the recorded information is reproduced.

Note that the mark length herein refers to a length of a prepit in a track direction and/or a distance between adjacent prepits in the track direction. Further, the mark length is nearly an integral multiple of a channel bit length. For example, in a read-only DVD (Digital Versatile Disc), a shortest mark length is 0.4 µm, which is nearly three times longer than the channel bit length, and there are nine varieties of mark lengths. In a read-only CD (Compact Disc), the shortest mark length is 0.83 µm, which is nearly three times longer than the channel bit length, and there are nine varieties of mark lengths. The super resolution technology can be also applied to a recordable optical information storage medium, where there exists a row of prepits, as address pits, each constituted by a concavity and/or a convexity.

Currently, various kinds of super resolution techniques for reproducing the prepit row have been proposed, including a super resolution technique using a thermochromic film and a super resolution technique using a photochromic film.

For example, a super resolution medium disclosed in Patent Literature 1 is such that a thermochromic dye layer, as a mask layer, that changes its optical property, such as transmittance, with temperature is provided on a reproduction-light-striking surface of a reflection layer. Note that the mask layer is a layer that causes super resolution phenomenon, such as pseudo reduction of a laser spot.

In the super resolution medium disclosed in Patent Literature 1, transmittance distribution occurs due to temperature distribution caused by light intensity distribution that occurs in the laser spot on a reproduction layer located near the reproduction-light-striking surface. For example, assume that the reproduction layer is made from a material that increases a transmittance with temperature. In this case, a transmittance in a high-temperature area only increases, which causes pseudo reduction of the laser spot on the surface of the reflection layer. This makes it possible to reproduce a signal corresponding to a prepit row having a shortest mark length shorter than the resolution limit of the playback apparatus.

Incidentally, the super resolution medium generally requires reproduction light having higher power than the normal medium. One of the reasons for this is that a laser spot is reduced in a pseudo manner by utilizing heat generated in a thin film by the high-power reproduction light and/or the amount of the high-power reproduction light. Further, the amount of change in property of the super resolution medium, for example, error rate (error occurrence rate), caused due to change in reproduction setting values (setting values required for reproduction of recorded information), i.e., a reproduction power value, a servo offset value, a spherical aberration correction value, and a tilt is larger than the amount of change in property of the normal medium. One of the reasons for this is that change in heat generated in a thin film by the reproduction light and/or the amount of the reproduction light changes light intensity distribution of the laser spot to be reduced in a pseudo manner.

For the super resolution medium, it is therefore desirable that optimum reproduction setting values are recorded in advance in the medium.

For example, a super resolution medium disclosed in Patent Literature 2 contains information on optimum reproduction power in advance and therefore enables an effective spot diameter to be always kept constant only by focus servo.

CITATION LIST

Patent Literature 1
Japanese Patent Application Publication, Tokukaihei, No. 6-162564 A (Publication Date: Jun. 10, 1994)
Patent Literature 2
Japanese Patent Application Publication, Tokukaihei, No. 7-73506 A (Publication Date: Mar. 17, 1995)

SUMMARY OF INVENTION

However, optimum reproduction setting values recorded in advance in the super resolution medium are merely values that optimize properties of the super resolution medium at the time of manufacture thereof, for example, values that realize the lowest error rate on the prepit row having a shortest mark length shorter than the resolution limit of the playback apparatus.

Thus, optimum reproduction setting values when there occur misalignment of the super resolution medium at the loading into the playback apparatus and/or deviation caused by actual operation (mechanical deviation caused by temperature, humidity, vibration, shock, and other factors) are different from original optimum reproduction setting values recorded in advance in the super resolution medium. Further, depending upon variations in property of a playback apparatus by which the super resolution medium is actually played, the optimum reproduction setting values are different from the original optimum reproduction setting values recorded in advance in the super resolution medium. This results in such problems that a lowest error rate is worsened and that a margin such as defocus margin is narrowed.

The following will describe the reason for the occurrence of the above problems.

In the super resolution medium, reproduction with laser light having higher power than laser light of the normal medium enables reproduction of a prepit row having a shortest mark length shorter than the resolution limit of the playback apparatus by pseudo reduction of a laser spot with the use of light amount distribution and temperature distribution of reproduction light in the laser spot. At this moment, deviation of the optimum reproduction setting values causes deviation of the light amount distribution and temperature distribution of the reproduction light in the laser spot from their optimum distributions. This changes pseudo reduction of a laser spot from its optimum state. This accounts for the occurrence of the above problems. Hereinafter, laser light power required for reproduction is referred to as "reproduction power".

Further, the optimum reproduction setting values recorded in advance in the super resolution medium are not determined for each one of plural super resolution media. For example, for each production lot or for each manufacturer of the super resolution media, the same optimum values of the super resolution medium are recorded in advance in each of the super resolution media. That is, recording of optimum reproduction setting values for each super resolution medium to cope with variations of the super resolution media at the time of manufacture is not carried out for the above super resolution media. This is because it takes high cost and much expense in time and effort to measure optimum reproduction setting values for each super resolution medium and then record the measured optimum reproduction setting values in the form of the prepit row.

Therefore, during playback there occurs a mismatch between the original optimum reproduction setting values recorded in advance in the super resolution medium and actual optimum reproduction setting values required to cope with the variations of the super resolution medium caused at the time of manufacture. This, in turn, causes the problems including the worsening of a lowest error rate and the narrowing of a margin such as defocus margin.

Further, it is assumed that an optimum value of the reproduction power is obtained by the above method in an information signal region where a content is recorded.

In this case, as described above, playback of the super resolution medium requires higher reproduction power than that of the normal medium. Therefore, the reproduction power is adjusted to high reproduction power. During the adjustment, application of reproduction power higher than optimum reproduction power causes damage to the super resolution medium due to factors, such as oxidation of a thin film and/or melting of a substrate. This may cause such a problem that it becomes impossible to reproduce the content recorded in the information signal region again.

The present invention has been attained in view of the above problems, and an object thereof is to provide an optical information storage medium that is a super resolution optical information storage medium that can be optimally played back for each medium.

In order to solve the above problems, an optical information storage medium of the present invention is an optical information storage medium where information is recorded in a form of prepits each made up of at least either a concavity or a convexity, and the information is reproduced by irradiating light to the prepits in an optical information storage medium playback apparatus, the optical information storage medium including: an information signal region where a content is recorded; and a test read region where reproduction setting value adjustment information is recorded for adjusting a setting value for the reproduction performed by the optical information storage medium playback apparatus, wherein: the information signal region has a first prepit row which is made up of a plurality of prepits, and a shortest mark length on the first prepit row is shorter than a length of an optical system resolution limit of the optical information storage medium playback apparatus; the test read region has a second prepit row which is made up of a plurality of prepits for the adjustment, and types of mark lengths on the second prepit row are the same as all or some types of mark lengths on the first prepit row; the second prepit row includes a prepit having a mark length shorter than the length of the optical system resolution limit of the optical information storage medium playback apparatus; and each of the first and second prepit rows has at least three types of mark lengths.

According to the above arrangement, an optical information storage medium of the present invention includes the information signal region and the test read region. In the information signal region, a content is recorded in a form of prepits each made up of at least either a concavity or a convexity. Further, the shortest mark length on the first prepit row, which is made up of a plurality of prepits formed in the information signal region, is shorter than a length of an optical system resolution limit of the playback apparatus. Note that "optical system resolution limit of the playback apparatus", i.e., "resolution limit" herein, which is determined by a wavelength $\lambda$ of reproduction laser light of the optical information storage medium playback apparatus that reads the optical information storage medium and a numerical aperture NA of an objective lens of the playback apparatus, is theoretically represented by $\lambda/4NA$. Meanwhile, the test read region is provided as a region for adjustment of a setting value for playback performed by the playback apparatus. Types of mark lengths on the second prepit row, which is made up of a plurality of prepits for the adjustment in the test read region, are the same as part or all types of mark lengths on the first prepit row.

With this arrangement, an optimum setting value in the information signal region becomes identical to an optimum setting value in the test read region. The optical information storage medium playback apparatus obtains the optimum setting value by reading the prepits in the test read region.

Then, the optical information storage medium playback apparatus reads the prepits in the information signal region in accordance with the obtained optimum value, so that the content in the information signal region can be reproduced optimally on a medium-by-medium basis.

Note that the mark length herein refers to at least either the length of the prepit in the track direction or a distance between adjacent prepits in the track direction.

Further, according to the above arrangement, the second prepit row includes a prepit having a mark length shorter than the length of the optical system resolution limit of the playback apparatus. This is because a prepit that has the most effect on determination of a reproduction setting value (particularly reproduction power value) on the second prepit row is a prepit having a mark length shorter than the length of the optical system resolution limit of the playback apparatus. The second prepit row includes a prepit having a mark length shorter than the length of the optical system resolution limit of the playback apparatus, whereby an optimum setting value obtained by reading of the prepit in the test read region can be more suitably matched to the information signal region.

Incidentally, the presence of one or two types of mark lengths in the information signal region decreases encoding efficiency and therefore decreases substantial information density. Further, since CD and DVD, for example, have nine types of mark lengths, one or two types of mark lengths are not practical. Thus, it is preferable that marks in the information signal region are of at least three different lengths. Still further, it is preferable that the second prepit row in the test read region has the same mark lengths as all types of mark lengths of the first prepit row in the information signal region. Thus, it is preferable that the information signal region and the test read region each have three or more types of mark lengths. With this arrangement, it is possible to obtain a more optimum setting value (at least one of a reproduction power value, a focus servo offset value, a spherical aberration correction value, and a tilt). The "tilt" herein refers to an angle (tilt) formed between a direction of the normal of a recording surface of the optical information storage medium that is read by the optical information storage medium playback apparatus and a direction in which light striking to the recording surface travels.

This yields the effect of realizing playback suitable for each medium.

Incidentally, it was found that a tracking servo becomes less stable in the test read region than in the information signal region. This is because change in the reproduction setting value, such as the focus servo offset value, in the test read region may reduce a tracking error signal.

Further, it was found that the tracking servo becomes less stable on the super resolution medium than on the normal medium with respect to change in the reproduction setting value.

The reason for this is considered as follows.

As described previously, in the super resolution medium, change in the amount of heat generated in a thin film by the reproduction light and/or change in the amount of the reproduction light, caused due to change in the reproduction power value, the servo offset value, the spherical aberration correction value, and the tilt, changes intensity distribution of a laser spot to be reduced in a pseudo manner. Therefore, the extent of change in the tracking error signal caused by the change in the reproduction power value and the other values in the super resolution medium is greater than in the normal medium. This accounts for the above finding.

That is, in the super resolution medium, assume that the playback apparatus obtains optimum reproduction setting values from which the lowest error rate value, for example, can be obtained by changing the reproduction setting values, while reading the prepit row in the test read region having the shortest mark length shorter than the length of the resolution limit of the playback apparatus. In this case, the tracking servo becomes unstable. This may make it impossible to obtain optimum reproduction setting values. This, in turn, may cause the problems including the worsening of an error rate and the narrowing of a margin such as defocus margin.

Further, when the content in the information signal region is reproduced with reproduction power higher than the optimum value due to the tracking servo being unstable, the super resolution medium may become damaged.

Still further, at the moment in time when control by the tracking servo becomes impossible due to the tracking servo being unstable, control by the focus servo becomes similarly impossible in the worst case. This may cause problems, including such a problem that contact of a pickup of the playback apparatus with the super resolution medium causes damage to the super resolution medium so that information in the super resolution medium cannot be reproduced again or causes malfunction of the pickup so that the playback apparatus is rendered inoperable.

In view of this, an optical information storage medium of the present invention is characterized in that amplitude of a tracking error signal in the test read region is greater than amplitude of a tracking error signal in the information signal region.

According to the above arrangement, amplitude of a tracking error signal relevant to stability of the tracking servo, in the test read region, is greater than amplitude of a tracking error signal in the information signal region, regardless of whether a tracking error detection mode of an optical information storage medium playback apparatus that reads the optical information storage medium of the present invention is a DPD (Differential Phase Detection: heterodyne mode or phase difference mode) mode or a push-pull mode. Therefore, the tracking servo becomes more stable in the test read region than in the information signal region. This makes it possible to obtain optimum values of setting values for reproduction (at least one of a reproduction power value, a focus servo offset value, a spherical aberration correction value, and a tilt) by significantly changing the setting values.

In this case, it is not preferable to excessively increase the amplitude of the tracking error signal in the information signal region. With increase in the amplitude of the tracking error signal in the information signal region, the tracking servo becomes stable. However, when the amplitude exceeds a given value, an error rate of a reproduction signal in the information signal region worsens.

Meanwhile, the test read region serves the purpose of obtaining optimum reproduction setting values. Therefore, even if the error rate of the reproduction signal slightly worsens to some degree when the amplitude of the tracking error signal exceeds the given value, the tracking servo becomes stable. Therefore, it is possible to suitably obtain the optimum reproduction setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again or causes malfunction of the pickup so that the optical information storage medium playback apparatus is rendered inoperable.

Further, an optical information storage medium of the present invention is characterized in that $TPi < TPt \leq \lambda/NA$ is satisfied, where $\lambda$ represents a wavelength of reproduction laser light of the optical information storage medium playback apparatus, NA represents a numerical aperture of an objective lens of the optical information storage medium playback apparatus, TPi represents a track pitch in the information signal region, and TPt represents a track pitch in the test read region.

According to the above arrangement, amplitude of a tracking error signal relevant to stability of the tracking servo in the test read region is greater than amplitude of a tracking error signal in the information signal region, regardless of whether a tracking error detection mode of an optical information storage medium playback apparatus that reads the optical information storage medium of the present invention is a DPD mode or a push-pull mode. Therefore, the tracking servo becomes more stable in the test read region than in the information signal region. This makes it possible to obtain optimum values of setting values for reproduction (at least one of a reproduction power value, a focus servo offset value, a spherical aberration correction value, and a tilt) by significantly changing the setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again or causes malfunction of the pickup so that the optical information storage medium playback apparatus is rendered inoperable.

Further, according to the above arrangement, a track pitch in the test read region is wider than a track pitch in the information signal region. This makes it possible to reduce crosstalk of the reproduction signal in the test read region (volume of a signal leaked from an adjacent track). If much crosstalk occurs, the amount of noise increases at the signal reproduction, and the error rate therefore worsens. In other words, according to the above arrangement, as compared with a case where the track pitch in the test read region is the same as the track pitch in the information signal region, it is possible to reduce noise. This makes it possible to improve the error rate in the test read region and to obtain more reliable optimum reproduction setting values.

Still further, an optical information storage medium of the present invention is characterized in that a ratio of prepits having the shortest mark length to total number of prepits on the second prepit row is lower than a ratio of prepits having the shortest mark length to total number of prepits on the first prepit row.

According to the above arrangement, a ratio of prepits having the shortest mark length to total number of prepits on the second prepit row is lower than a ratio of prepits having the shortest mark length to total number of prepits on the first prepit row. A ratio of mark lengths (a ratio of occurrences of mark lengths) herein is calculated by dividing the number of occurrences of a particular mark length on a prepit row of one track by the number of occurrences of mark lengths of all types on the prepit row of one track, i.e. by dividing the number of prepits having a particular mark length on the prepit row of one track by the number of all prepits on the prepit row of one track.

In a case where a tracking error detection mode of an optical information storage medium playback apparatus that reads the optical information storage medium of the present invention is the DPD mode, a ratio of occurrences of the shortest mark length, which causes decrease in amplitude of the tracking error signal relevant to stability of the tracking servo (that is, makes the tracking servo unstable), is lower in the test read region than in the information signal region. Therefore, the tracking servo becomes more stable in the test read region than in the information signal region. This makes it possible to obtain optimum values of setting values for reproduction (at least one of a reproduction power value, a focus servo offset value, a spherical aberration correction value, and a tilt) by significantly changing the setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again or causes malfunction of the pickup so that the optical information storage medium playback apparatus is rendered inoperable.

Further, according to the above arrangement, it is possible to stabilize the tracking servo only by changing a ratio of occurrences of the prepit having the shortest mark length, without making the shape of the prepit in the test read region different from the shape of the prepit in the information signal region. That is, it is possible to stabilize the tracking servo only by changing the arrangement of prepits, without changing mastering condition (resist thickness, etc.) at the prepit formation or write strategy (process of changing a recording method according to subtle differences between optical information storage media at the actual recording of a recording signal onto the optical information storage medium). This yields cost reduction effect.

Yet further, an optical information storage medium of the present invention is characterized in that a ratio of prepits having a longest mark length to total number of prepits on the second prepit row is higher than a ratio of prepits having the longest mark length to total number of prepits on the first prepit row.

According to the above arrangement, a ratio of prepits having a longest mark length to total number of prepits on the second prepit row is higher than a ratio of prepits having the longest mark length to total number of prepits on the first prepit row.

In a case where a tracking error detection mode of an optical information storage medium playback apparatus that reads the optical information storage medium of the present invention is the DPD mode, a ratio of occurrences of the longest mark length, which causes increase in amplitude of the tracking error signal relevant to stability of the tracking servo (stabilizes the tracking servo), is higher in the test read region than in the information signal region. Therefore, the tracking servo becomes more stable in the test read region than in the information signal region. This makes it possible to obtain optimum values of setting values for reproduction (at least one of a reproduction power value, a focus servo offset value, a spherical aberration correction value, and a tilt) by significantly changing the setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again or causes malfunction of the pickup so that the optical information storage medium playback apparatus is rendered inoperable.

Further, according to the above arrangement, it is possible to stabilize the tracking servo only by changing a ratio of occurrences of the prepit having the shortest mark length, without making the shape of the prepit in the test read region different from the shape of the prepit in the information signal region. That is, it is possible to stabilize the tracking servo only by changing the arrangement of prepits, without changing mastering condition at the prepit formation or write strategy. This yields cost reduction effect.

Further, an optical information storage medium of the present invention is characterized in that $Di/2 \leq Dt < Di$ is satisfied, where Di represents a depth of a prepit on the first prepit row and Dt represents a depth of a prepit on the second prepit row.

According to the above arrangement, in a case where a tracking error detection mode of an optical information storage medium playback apparatus that reads the optical information storage medium of the present invention is the push-pull mode, the tracking servo becomes more stable in the test read region than in the information signal region when amplitude of the tracking error signal relevant to stability of the tracking servo is greater in the test read region than in the information signal region. This makes it possible to obtain optimum values of setting values for reproduction (at least one of a reproduction power value, a focus servo offset value, a spherical aberration correction value, and a tilt) by significantly changing the setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again or causes malfunction of the pickup so that the optical information storage medium playback apparatus is rendered inoperable.

Further, according to the above arrangement, the depth of the prepit in the test read region is less than the depth of the prepit in the information signal region. In this case, the prepits can be transferred more accurately from a master plate to a stamper and then from the stamper to a substrate so that the prepits are formed on the substrate, as compared with a case where the depth of the prepit in the test read region is the same as the depth of the prepit in the information signal region. This makes it possible to decrease the factors responsible for noise, such as uneven transfer that occurs at the time of transfer and burrs that are formed at the time of transfer. Therefore, it is possible to improve the error rate in the test read region and obtain the optimum reproduction setting values more accurately.

Still further, an optical information storage medium of the present invention is characterized in that $Wi < Wt \leq TPt/2$ is satisfied, where TPt represents the track pitch in the test read region, Wi represents a pit width of a prepit on the first prepit row, and Wt represents a pit width of a prepit on the second prepit row.

According to the above arrangement, in a case where a tracking error detection mode of an optical information storage medium playback apparatus that reads the optical information storage medium of the present invention is the push-pull mode, the tracking servo becomes more stable in the test read region than in the information signal region when amplitude of the tracking error signal relevant to stability of the tracking servo is greater in the test read region than in the information signal region. This makes it possible to obtain optimum values of setting values for reproduction (at least one of a reproduction power value, a focus servo offset value, a spherical aberration correction value, and a tilt) by significantly changing the setting values.

This yields the effect of further improving the error rate and further widening a margin such as a defocus margin. Further, it is possible to prevent the problems, including the problem that contact of a pickup of the optical information storage medium playback apparatus with the optical information storage medium causes damage to the optical information storage medium so that information in the optical information storage medium cannot be reproduced again, or causes malfunction of the pickup so that the optical information storage medium playback apparatus is rendered inoperable.

Further, according to the above arrangement, the pit width of the prepit in the test read region is greater than the pit width of the prepit in the information signal region. In this case, the prepits can be transferred more accurately from a master plate to a stamper and then from the stamper to a substrate so that the prepits are formed on the substrate, as compared with a case where the pit width of the prepit in the test read region is the same as the pit width of the prepit in the information signal region. This makes it possible to decrease the factors responsible for noise, such as uneven transfer that occurs at the time of transfer and burrs that are formed at the time of transfer. Therefore, it is possible to improve the error rate in the test read region and obtain the optimum reproduction setting values more accurately.

Further, an optical information storage medium playback apparatus of the present invention is an optical information storage medium playback apparatus capable of reading any one of the above optical information storage media, characterized by including: reproducing means for reproducing information recorded at a desired position in the optical information storage medium; and control means for obtaining an optimum setting value on a basis of a reproduction signal that has been read off a prepit of the test read region in the optical information storage medium by the reproducing means, and then for controlling the reproducing means in accordance with the optimum setting value.

According to the above arrangement, an optimum value of the setting value for reproduction, which setting value varies due to mechanical deviation at the loading and operation, property variation of each playback apparatus, and property variation of each optical information storage medium, is obtained from the test read region for each optical information storage medium, after which the information signal region where a content is recorded is read. This yields the effect of optimizing reproduction of a content in the information signal region on a medium-by-medium basis.

Further, a method of controlling optical information storage medium playback apparatus of the present invention is a method of controlling an optical information storage medium playback apparatus capable of reading an optical information storage medium, characterized by including: a reproduction step of reproducing information recorded at a desired position in the optical information storage medium; and a control step of obtaining an optimum setting value on a basis of a reproduction signal that has been read off a prepit of the test read region in the optical information storage medium in the reproduction step, and then controlling the reproduction in the reproduction step in accordance with the optimum setting value.

According to the above arrangement, an optimum value of the setting value for reproduction, which setting value varies due to mechanical deviation at the loading and operation, property variation of each playback apparatus, and property variation of each optical information storage medium, is obtained from the test read region for each optical information storage medium, after which the information signal region where a content is recorded is read. This yields the effect of optimizing reproduction of a content in the information signal region on a medium-by-medium basis.

Note that the optical information storage medium playback apparatus may be realized by a computer. In this case, the scope of the present invention encompasses: a control program of an optical information storage medium playback apparatus, which program realizes the optical information storage medium playback apparatus by means of a computer by causing the computer to operate as the control means; and a computer-readable storage medium storing the control program therein.

As described above, an optical information storage medium of the present invention is an optical information storage medium where information is recorded in a form of prepits each made up of at least either a concavity or a convexity, and the information is reproduced by irradiating light to the prepits in an optical information storage medium playback apparatus, and the optical information storage medium includes: an information signal region where a content is recorded; and a test read region for adjusting a setting value for the reproduction performed by the optical information storage medium playback apparatus, wherein: the information signal region has a first prepit row which is made up of a plurality of prepits, and a shortest mark length on the first prepit row is shorter than a length of an optical system resolution limit of the optical information storage medium playback apparatus; the test read region has a second prepit row which is made up of a plurality of prepits for the adjustment, and types of mark lengths on the second prepit row are the same as part or all types of mark lengths on the first prepit row; the second prepit row includes a prepit having a mark length shorter than the length of the optical system resolution limit of the optical information storage medium playback apparatus; and each of the first and second prepit rows has at least three types of mark lengths.

In an optical information storage medium of the present invention, i.e. a super resolution optical information storage medium, this yields the effect of optimizing reproduction of a content in the information signal region on a medium-by-medium basis.

BRIEF DESCRIPTION OF DRAWINGS

FIG. 1 is a view showing one embodiment of the present invention and is a plan view schematically showing the configuration of a super resolution medium.

FIG. 2

FIG. 2 is a cross-sectional view partially showing the configuration of the super resolution medium.

FIG. 3 is an enlarged plan view showing a prepit row in the information signal region of the super resolution medium and is a cross-sectional view taken along a line 21a-21b.

FIG. 4 is an enlarged plan view showing a prepit row in the test read region of the super resolution medium and is a cross-sectional view taken along a line 22a-22b.

FIG. 5 is a graph showing amplitude of a reproduction signal and amplitude of a tracking error signal in a push-pull mode, relative to a pit depth.

FIG. 6 is a view showing one embodiment of the present invention and is a block diagram schematically showing the configuration of an optical storage medium playback apparatus.

FIG. 7 is a block diagram showing the configuration of a control section in the optical storage medium playback apparatus.

FIG. 8 is a flowchart showing the flow of the operation of the optical storage medium playback apparatus.

REFERENCE SIGNS LIST

1 Super Resolution Medium (Optical Information Storage Medium)
2 Substrate
3 Reflection Layer
4 Super Resolution Reproduction Layer
5 Cover Layer
11 Information Signal Region
12 Test Read Region
21 Prepit Row (First Prepit Row)
22 Prepit Row (Second Prepit Row)
100 Playback Apparatus (Optical Information Storage Medium Playback Apparatus)
101 Semiconductor Laser
102 Collimator Lens
103 Beam Shaping Prism
104 Beam Splitter
105 Objective Lens
106 Detection Optical System
107 Spindle Motor
108 Head (Reproducing Means)
109 Control Section (Control Means)
110A Laser Control Circuit
110B Signal Processing Circuit
111 Head Amplifier
112A RF Amplifier
112B RF Signal Processing Circuit
113 Servo Processing Circuit
114 Optical Pickup Motor
115 Beam Expander Control Circuit
116 Optical Head Tilt Control Circuit
117 Actuator
118 Beam Expander
119 Tilt Adjusting System
131 Access Position Control Section
132 Signal Processing Section
133 Medium Identifying Section
134 Reproduction Condition Adjusting Section
134A Reproduction Power Value Adjusting Section
134B Servo Offset Value Adjusting Section
134C Spherical Aberration Correction Value Adjusting Section
134D Tilt Adjusting Section

DESCRIPTION OF EMBODIMENTS

First Embodiment

An optical information storage medium according to one embodiment of the present invention will be described below with reference to FIGS. 1 through 5.

Figure 1:
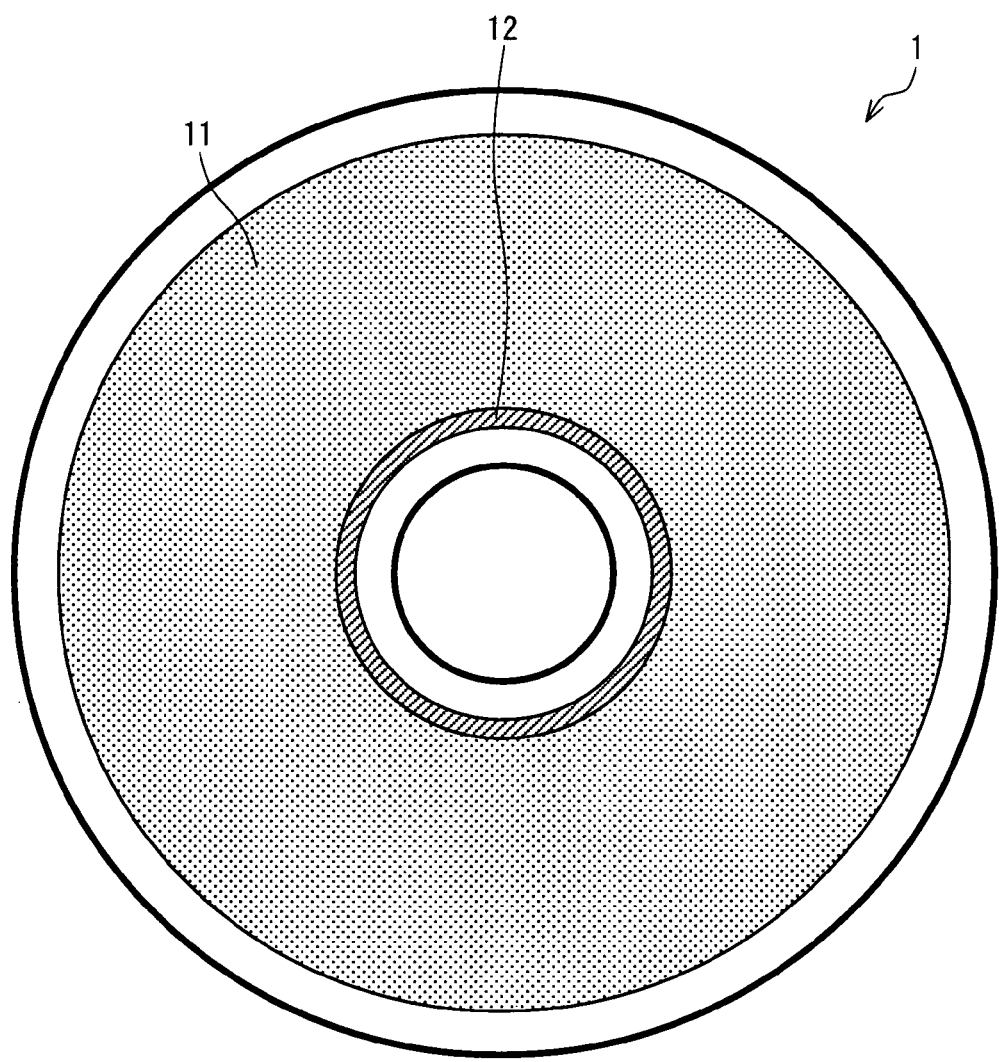
FIG. 1

FIG. 1 is a view schematically illustrating the configuration of an optical information storage medium according to the present embodiment, and FIG. 2 is a cross-sectional view partially illustrating the configuration of the optical information storage medium.

A super resolution medium (optical information storage medium) 1 shown in FIG. 1 is a read-only optical information storage medium and is an optical information storage medium having a BD (Blu-ray Disc) type cross section. In the following descriptions, a playback apparatus (optical information storage medium playback apparatus) 100 (see FIG. 6) refers to an optical information storage medium playback apparatus, which will be described in another embodiment. The optical information storage medium playback apparatus can read both the super resolution medium 1 and a normal optical information storage medium.

The super resolution medium 1 is provided with an information signal region 11 where contents, such as video and/or audio, are recorded, and a test read region 12 where information for adjusting a reproduction setting value (reproduction setting value adjustment information) is recorded. Note that the reproduction setting value is at least one of a reproduction power value, a servo offset value, a spherical aberration correction value, and a tilt, or all of them.

As shown in FIG. 2, the super resolution medium 1 has a structure in which on a substrate 2 are provided a reflection layer 3 (50 nm in thickness if it is made from silicon), a super resolution reproduction layer 4 (105 nm in thickness if it is made from zinc oxide) that enables super resolution reproduction, and a translucent cover layer 5 (100 μm in thickness). Note that thicknesses of the reflection layer 3, the super resolution reproduction layer 4, and the cover layer 5 are not limited to the thicknesses respectively specified in the above parentheses, and can be appropriately determined according to a design of the super resolution medium 1.

Reproduction laser light emitted from the playback apparatus 100 is directed into the cover layer 5 of the super resolution medium 1.

As the substrate 2, various kinds of well-known substrates can be used. Such a substrate 2 is, for example, a substrate made from polyolefin-based resin, polycarbonate resin, or the like.

The reflection layer 3 can be made from silicon, aluminum, or the like material, and the super resolution reproduction layer 4 can be made from zinc oxide or the like material. However, this is not the only possibility. The reflection layer 3 and the super resolution reproduction layer 4 may be formed with any materials in any structures as long as the materials and structures realize the super resolution reproduction. Note that the reflection layer 3 may be omitted if the super resolution reproduction is realized only with the super resolution reproduction layer 4. Further, the reflection layer 3 and the super resolution reproduction layer 4 are formed, for example, by sputtering or vacuum deposition.

The cover layer 5 can be made from polycarbonate resin, transparent ultraviolet curing resin, or the like material. Note that in a case where the cover layer 5 is formed with transparent ultraviolet curing resin or the like material, the cover layer 5 is formed by a spin coat method. Further, in order to form the cover layer 5 with polycarbonate resin, the cover layer 5 is formed by adhering a 100 μm-thick polycarbonate sheet to the super resolution reproduction layer 4.

Figure 3:
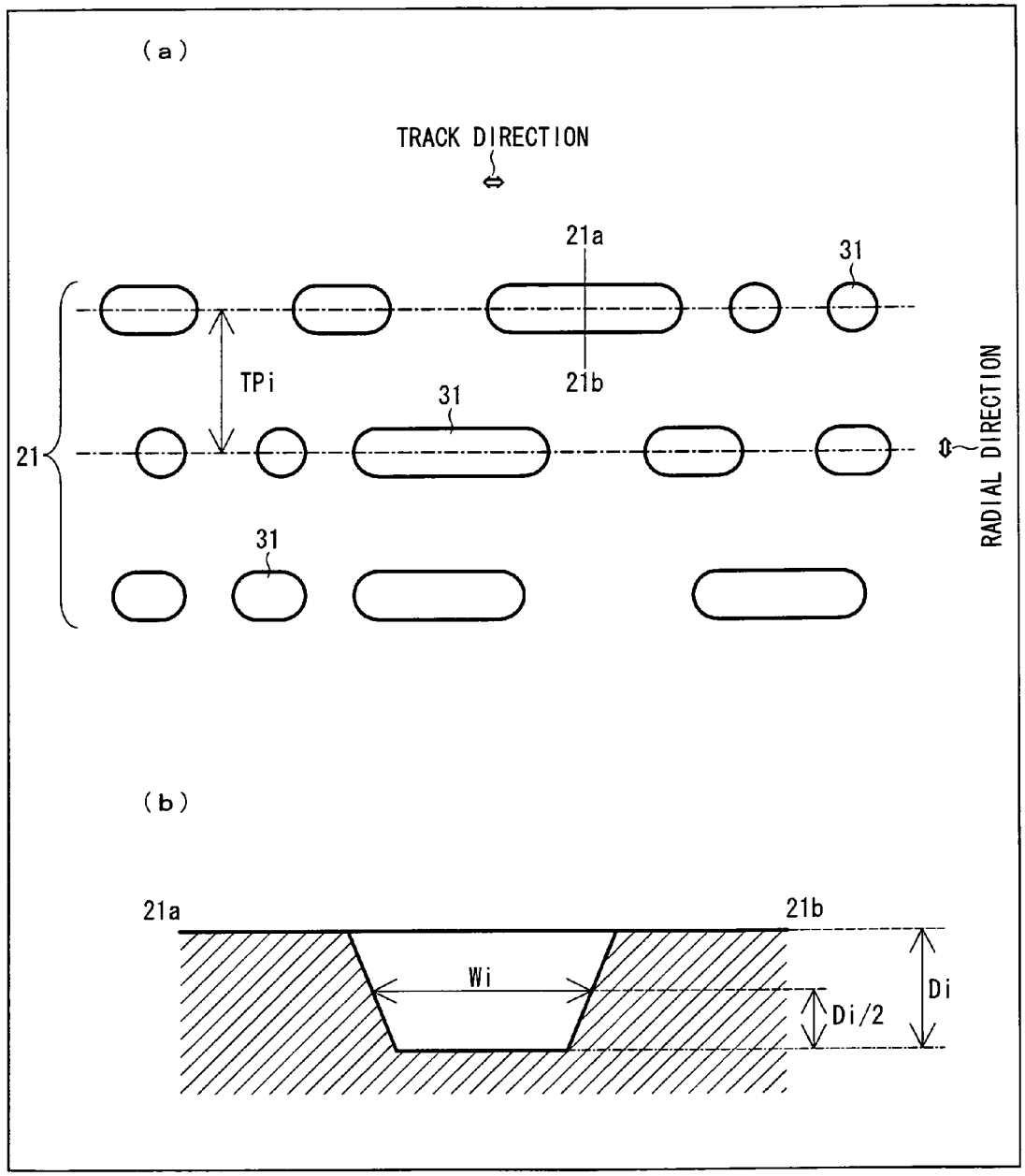
FIG. 3
Figure 4:
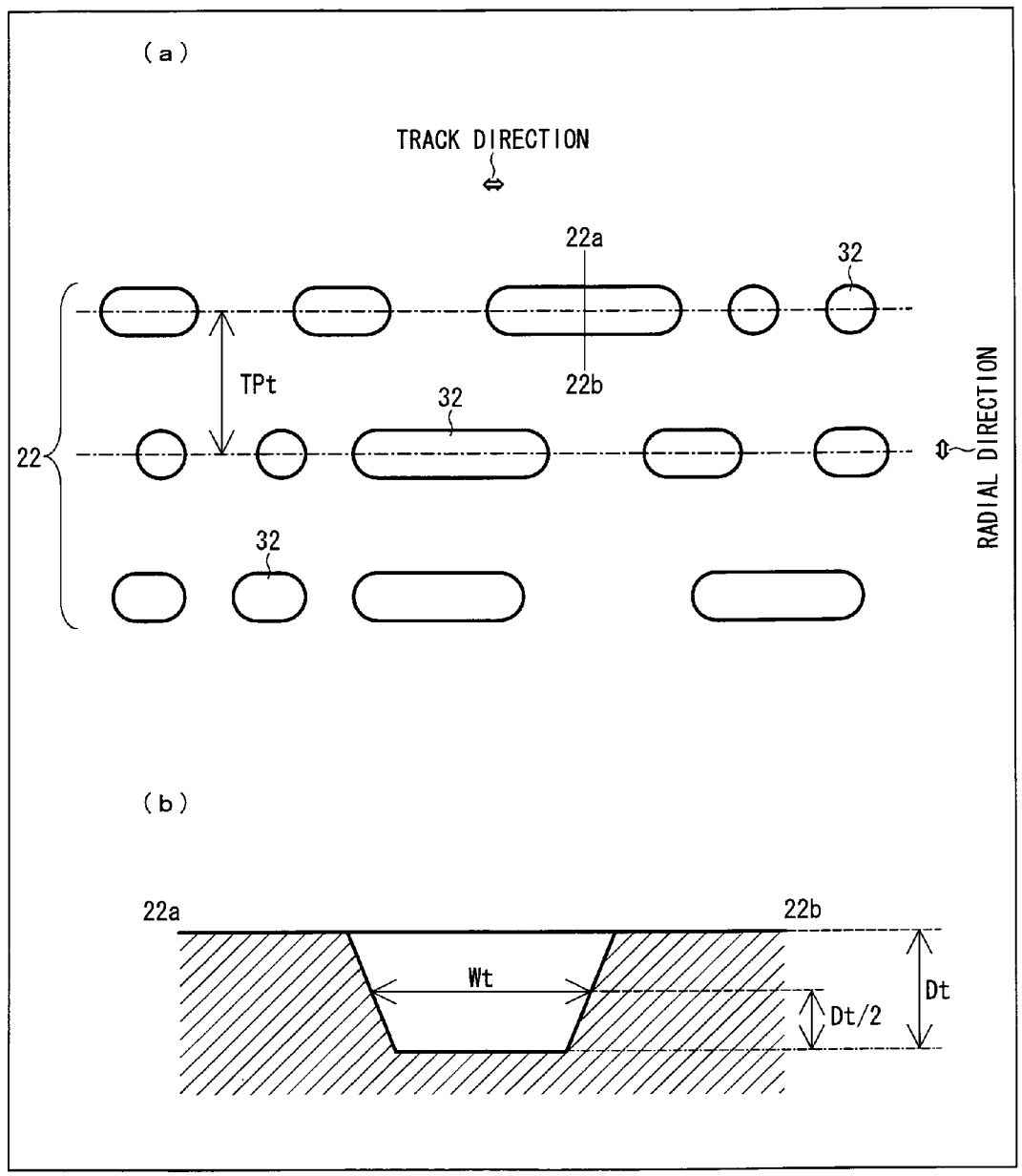
FIG. 4

(a) of FIG. 3 is an enlarged plan view showing prepit rows 21 in the information signal region 11 of the super resolution medium 1. (b) of FIG. 3 is a cross-sectional view of the prepit row 21 taken along the line 21a-21b of (a) of FIG. 3. Further, (a) of FIG. 4 is an enlarged plan view showing prepit rows 22 in the test read region 12 of the super resolution medium 1. (b) of FIG. 4 is a cross-sectional view of the prepit row 22 taken along the line 22a-22b of (a) of FIG. 4.

On the substrate 2, prepit rows (first prepit rows) 21 (see FIG. 3) are formed, in advance, in a spiral manner or concentrically in the information signal region 11. Each of the prepit rows 21 is made up of concavities and/or convexities. Further, each of the prepit rows 21 has a shortest mark length shorter than the length of a resolution limit of the playback apparatus 100 and has at least three types of mark lengths.

Besides, on the substrate 2, prepit rows (second prepit rows) 22 (see FIG. 4) are formed, in advance, in a spiral manner or concentrically in the test read region 12.

Here, it is noteworthy that the mark lengths of the prepit row 22 in the test read region 12 are nearly the same as those of the prepit row 21 in the information signal region 11.

As described above, the playback of the super resolution medium having a shortest mark length shorter than the resolution limit of the playback apparatus 100 requires higher reproduction power than power required for the playback of the normal medium. Further, in the super resolution medium, an optimum value of a reproduction power value and/or a focus servo offset value, which optimum value enables amplitude of a reproduction signal to reach its peak, or an optimum value thereof that realizes a lowest error rate varies depending upon mark lengths. One of the reasons for this is as follows. A laser spot size that enables the amplitude of the reproduction signal to reach its peak or a laser spot size that realizes the lowest error rate varies depending upon the mark lengths. Accordingly, the reproduction power value and/or the focus servo offset value, which affects a degree of pseudo reduction of the laser spot, also varies depending upon the mark lengths.

In this case, if the prepit row 22 in the test read region 12 has a mark length about the same as a mark length of the prepit row 21 in the information signal region 11, an optimum value of the reproduction power value and/or the focus servo offset value in the test read region is about the same as an optimum value of the reproduction power value and/or the focus servo offset value in the information signal region 11. This makes it possible to obtain an optimum reproduction setting value with high accuracy, which significantly improves the error rate.

As shown in (a) and (b) of FIG. 3, a pit depth, a pit width, and a track pitch of a prepit 31 of the prepit row 21 in the information signal region 11 are represented by Di, Wi, and TPi, respectively. As shown in FIGS. 4(a) and 4(b), a pit depth, a pit width, and a track pitch of a prepit 32 of the prepit row 22 in the test read region 12 are represented by Dt, Wt, and TPt, respectively.

Here, the pit width Wi, as shown in (b) of FIG. 3, refers to a pit length of the prepit 31 in a radial direction thereof in a surface at a middle height between a bottom surface and an opening surface in the prepit 31, that is, at a height of Dt/2 from the bottom surface. The pit width Wt, as shown in (b) of FIG. 4, refers to a pit length of the prepit 32 in a radial direction thereof in a surface at a middle height between a bottom surface and an opening surface in the prepit 32, that is, at a height of Dt/2 from the bottom surface in the prepit 32.

In the information signal region 11, a content, such as video and/or audio, is recorded in the form of the prepit row 21 having a shortest mark length shorter than the length of a resolution limit of the playback apparatus 100 and a longest mark length, and also having at least three types of mark lengths. The shortest mark length, the longest mark length, and the number of types of mark lengths are not limited to the above. However, it is preferable that the prepit row 21 have at least 3 types of mark lengths.

One of the reasons for this is described as follows.

A digital signal of a content is generally encoded according to a predetermined rule, and then recorded in the form of the prepit row 21 having a plurality of types of mark lengths. In a case where an encoding method in which the digital signal is encoded with one or two types of mark lengths is adopted, encoding efficiency is decreased and therefore information density is also decreased. For this reason, the adoption of such an encoding method is not practical.

Therefore, a content to be recorded in the information signal region 11 is recorded in the form of a prepit row having at least three types of mark lengths, for example, in the form of a prepit row having seven types of mark lengths.

The following exemplify the number of types of mark lengths of a typical optical information storage medium. In a read-only CD and a read-only DVD, there are nine types of mark lengths, and a content to be recorded in an information signal region is recorded in a form of a prepit row having the nine types of mark lengths.

Further, a shortest mark length of the prepit row 21 formed in the information signal region 11 is shorter than the length of the resolution limit of the playback apparatus 100.

In the normal medium, in a case where a shortest mark length of a prepit row is shorter than the resolution limit of the playback apparatus 100, the playback apparatus 100 cannot reproduce a content recorded in the information signal region. For this reason, the shortest mark length of the prepit row formed in the normal medium is formed so as to be not shorter than the resolution limit of the playback apparatus 100.

In contrast, in the information signal region 11 of the super resolution medium 1, the shortest mark length is shorter than the length of the resolution limit of the playback apparatus 100. This arrangement allows the super resolution medium 1 to carry out recording with high density, as compared with the normal medium.

The resolution limit of the playback apparatus 100 is theoretically represented by $\lambda/4NA$, where $\lambda$ is a wavelength of reproduction laser light of the playback apparatus 100 and NA is a numerical aperture of an objective lens of the playback apparatus 100, as has been already described above. For example, when the wavelength $\lambda$ of the reproduction laser light of the playback apparatus 100 is 405 nm and the numerical aperture NA of the objective lens of the playback apparatus 100 is 0.85, the resolution limit of the playback apparatus 100, represented by $\lambda/4NA$, is 119 nm. At this time, the shortest mark length of the prepit row 21 can be set to any value, provided that the value is less than the resolution limit of the playback apparatus 100. In this case, the shortest mark length of the prepit row 21 may be set, for example, to 116 nm, which is less than the resolution limit of the playback apparatus 100.

The longest mark length of the prepit row 21 is not especially limited as long as the longest mark length is longer than the shortest mark length. Therefore, in the above case, the longest mark length of the prepit row 21 may be set, for example, to 464 nm, which is greater than the value of the shortest mark length of the prepit row 21.

Further, as shown in FIG. 2, since the super resolution medium 1 is provided with the super resolution reproduction layer 4, the playback apparatus 100 can read the prepit rows 21 and 22 each having a shortest mark length shorter than the length of the resolution limit of the playback apparatus 100.

The test read region 12 is a region provided, in advance, on an inner peripheral side of the information signal region 11, as shown in FIG. 1. In the test read region 12 are formed the prepit rows 22 for adjusting an optimum reproduction setting value for the playback of the information signal region 11.

The mark lengths of the prepit row 22 formed in the test read region 12 are about the same as those of the prepit row 21 in the information signal region 11 (i.e., the shortest mark length: 116 nm, the longest mark length: 464 nm, the number of types of mark lengths: 7).

In the super resolution medium 1, its properties (an error rate and the like) are largely affected by change in reproduction setting values as compared with the normal medium. However, since the super resolution medium 1 is arranged as such, it is possible to obtain optimum reproduction setting values before the playback of the information signal region 11 starts. This makes it possible to improve the error rate and to widen a margin such as a defocus margin or the like, as compared with a case where no test read region 12 is provided.

Even if the prepit row 22 in the test read region 12 does not include all of the plurality of types of mark lengths of the prepit row 21 in the information signal region 11, it is still possible to obtain actual optimum reproduction setting values. However, it is preferable that the prepit row 22 in the test read region 12 include all of the plurality of types of mark lengths of the prepit row 21 in the information signal region 11.

One of the reasons for this is as follows.

That is, as described above, the playback of the super resolution medium 1 having a shortest mark length shorter than the resolution limit of the playback apparatus 100 requires higher reproduction power than power required for the playback of the normal medium. Further, in the super resolution medium 1, reproduction setting values, such as an optimum reproduction power value and an optimum focus servo offset value, which enable amplitude of a reproduction signal to reach its peak or which realize a lowest error rate, vary depending upon the mark lengths. One of the reasons for this is as follows. A laser spot size that enables the amplitude of the reproduction signal to reach its peak or a laser spot size that realizes the lowest error rate varies depending upon the mark lengths. Accordingly, the reproduction power value and/or the focus servo offset value, which affects a degree of pseudo reduction of the laser spot, also varies depending upon the mark lengths.

On this account, one optimum value reproduction power value and/or one optimum focus servo offset value, in the information signal region 11 in which the prepit rows 21 each having at least 3 types of mark length are formed, are determined on the basis of prepit rows having all types of mark lengths that the prepit rows 21 may have. More specifically, for example, a reproduction power value and/or a focus servo offset value that realizes a lowest error rate is found on the basis of the prepit rows having all the types of mark lengths that the prepit rows 21 may have. In this case, it is possible to obtain a more optimum reproduction power value and/or a more optimum focus servo offset value as compared with a case where the optimum values are determined on the basis of prepit rows that do not have all the types of mark lengths.

In the present embodiment, the test read region 12 is provided on an inner peripheral side of the information signal region 11. However, a region where the test read region 12 is provided is not limited to this. The test read region 12 may be provided on an outer peripheral side of the information signal region 11, or may be provided inside the information signal region 11 as a different region.

However, in the super resolution medium 1, it is preferable to determine the region where the test read region 12 is provided, on the basis of a region where a lead-in-area (not shown) is provided.

The lead-in area is a region in which information for identifying a medium (a read-only type, a write-once type, a rewritable type, a super resolution medium, or the like) and information on recommendable recording power, reproduction power, and the like power are recorded in a form of prepit rows. Generally, reproduction power of the lead-in area is the same as reproduction power of the normal medium. Therefore, a shortest mark length of a prepit row in the lead-in area is preferably longer than the length of the resolution limit of the playback apparatus 100.

In a case where the super resolution medium 1 including the lead-in area is read by the playback apparatus 100, the playback apparatus 100 reads the lead-in area first. Accordingly, in this case, the playback apparatus 100 reads the lead-in area, the test read region 12, and then the information signal region 11, in this order.

Further, the lead-in area is normally provided in a region, in the super resolution medium 1, which is closer to a center of the super resolution medium 1 than the information signal region 11 and which is readable by the playback apparatus 100. On this account, the test read region 12 is also provided in the region closer to the center of the super resolution medium 1 than the information signal region 11, further preferably inside the lead-in area. This attains a reduction in distance (from the lead-in area to the test read region 12) that the after-mentioned pickup in the playback apparatus 100 moves after the lead-in area has been read.

As a result, it takes less time until the playback of the information signal region 11 starts, thereby making it possible to reproduce data immediately and to restrain power consumption necessary for moving the pickup.

Further, in a case where the lead-in area is provided on the outer periphery side of the information signal region 11 and the lead-in area should be read first on the basis of standards of an optical information storage medium and an optical information storage medium playback apparatus, the test read region 12 may be provided in a region closer to an outer periphery of the super resolution medium 1 than the information signal region 11, further preferably provided inside the lead-in area. This arrangement can yield the same effect as in the case where the lead-in area and the test read region 12 are provided in the region closer to the center of the super resolution medium 1 than the information signal region 11.

Further, in a case where the reproduction power value and the like value are optimized in the test read region 12 during the playback of the super resolution medium 1, it is preferable that the test read region 12 be also provided inside the information signal region 11.

In this case, the pickup moves a shorter distance from the test read region 12 to a part being read in the information signal region 11, and vice versa, as compared with the case where the test read region 12 is provided only on the inner peripheral side (or the outer peripheral side) of the information signal region 11. As a result, it is possible to restrain power consumption necessary for moving the pickup.

Furthermore, in a case of playback of another region which is not the information signal region 11, which has a shortest mark length shorter than the length of the resolution limit of the playback apparatus 100, and which has at least three types of mark lengths, it is also possible to use the test read region 12 to obtain an optimum value of a reproduction power value or the like value in that region.

More specifically, information recorded in the lead-in area, such as information indicative of a position of the information signal region 11, and/or address information in a rewritable optical information storage medium is recorded in a form of prepit rows which have a shortest mark length shorter than the resolution limit of the playback apparatus 100 and which have at least 3 types of mark lengths, the prepit rows of the lead-in area and/or the prepit rows of the address information are read after a reproduction power value and the like value is optimized in the test read region 12. This makes it possible to improve the error rate and to widen a margin such as a defocus margin.

Moreover, in a case where a reproduction setting value is constant, it is preferable that amplitude of a tracking error signal in the test read region 12 be greater than amplitude of a tracking error signal in the information signal region 11.

In the arrangement, regardless of whether a tracking error detection mode of the playback apparatus 100 is a DPD mode or a push-pull mode, amplitude of a tracking error signal relevant to stability of a tracking servo is greater in the test read region 12 than in the information signal region 11. Therefore, the tracking servo becomes more stable in the test read region 12 than in the information signal region 11. This makes it possible to obtain optimum values of setting values for reproduction (at least one of a reproduction power value, a focus servo offset value, a spherical aberration correction value, and a tilt) by significantly changing the setting values.

In this case, it is not preferable to excessively increase amplitude of the tracking error signal in the information signal region 11. With increase in the amplitude of the tracking error signal in the information signal region 11, the tracking servo becomes stable. However, when the amplitude exceeds a given value, an error rate of a reproduction signal in the information signal region 11 worsens.

Meanwhile, the test read region 12 serves the purpose of obtaining optimum reproduction setting values. Therefore, even if the error rate of the reproduction signal slightly worsens to some degree when the amplitude of the tracking error signal exceeds the given value, the tracking servo becomes stable. This makes it possible to suitably obtain the optimum reproduction setting values.

This yields the effect of further improving the error rate and further widening a margin such as a defocus margin. Further, it is possible to prevent such a problem that contact of the pickup of the playback apparatus 100 with the super resolution medium 1 causes damage to the super resolution medium 1 so that information in the super resolution medium 1 cannot be reproduced again or causes malfunction of the pickup so that the playback apparatus 100 is rendered inoperable.

Means for making the amplitude of the tracking error signal greater in the test read region 12 than in the information signal region 11 is not limited in any particular manner.

One of the examples of the means is described below.

It is preferable that a ratio of occurrences of the shortest mark length on the prepit row 22 in the test read region 12 be lower than a ratio of occurrences of the shortest mark length on the prepit row 21 in the information signal region 11.

A ratio of occurrences of mark lengths herein is calculated by dividing the number of occurrences of a predetermined mark length on a prepit row of one track by the number of occurrences of mark lengths of all types on the prepit row of one track. That is, a ratio of occurrences of the predetermined mark length means a ratio of occurrences of the predetermined mark length on one track. For example, a ratio of occurrences of a shortest mark length is calculated by dividing the number of occurrences of the shortest mark length on a prepit row of one track by the number of occurrences of mark lengths of all types on the prepit row of one track.

In a case where a tracking error detection mode of the playback apparatus 100 is the DPD mode, a ratio of occurrences of the shortest mark length, which causes decrease in amplitude of the tracking error signal relevant to stability of the tracking servo (that is, makes the tracking servo unstable), is lower in the test read region 12 than in the information signal region 11. Therefore, the tracking servo is more stable in the test read region 12 than in the information signal region 11. This makes it possible to obtain optimum reproduction setting values by significantly changing the setting values.

This yields the effect of further improving the error rate and further widening a margin such as a defocus margin. Further, it is possible to prevent the problems, including the problem that contact of the pickup of the playback apparatus 100 with the super resolution medium 1 causes damage to the super resolution medium 1 so that information in the super resolution medium 1 cannot be reproduced again or causes malfunction of the pickup so that the playback apparatus 100 is rendered inoperable.

The following describes the reason why such a low ratio of occurrences of the shortest mark length causes decrease in amplitude of the tracking error signal in the case where the tracking error detection mode of the playback apparatus is the DPD mode.

Initially explained is the tracking error detecting mode.

Recently, the aforementioned DPD mode and push-pull mode have been widely used as a tracking error detecting mode of an optical information storage medium. For example, the DPD mode has been widely used for a read-only DVD, and the pull-push mode has been widely used for a recordable DVD.

The DPD mode is such that diffracted-light amount distribution in a pit is detected by a 4-split photodetector and a phase difference between two sums each of signals on light-receiving surfaces diagonally opposite to each other is taken as a tracking error signal. Further, the push-pull mode is such that respective diffracted-light amount distributions of a pit and a race are detected by a 2-split photodetector and a difference between two split signals thus detected is taken as a tracking error signal. Note that a DPP (Differential Push-Pull) mode used for CD-R (Compact Disc Recordable) and CD-RW (Compact Disk Rewritable) is considered as the push-pull mode.

In the DPD mode, amplitude of a reproduction signal largely affects amplitude of a tracking error signal.

More specifically, the greater the amplitude of the reproduction signal is, the greater the amplitude of the tracking error signal becomes. Further, in the prepit rows 21 and 22, since the shortest mark length is shorter than the length of the resolution limit of the playback apparatus, amplitude of a reproduction signal of the shortest mark length is shorter than amplitude of reproduction signals of the other mark lengths. In other words, as the ratio of occurrences of the shortest mark length, i.e., the number of occurrences of the shortest mark length on one track is lower, the amplitude of the tracking error signal becomes greater. For this reason, in the case where the playback apparatus employs the DPD mode as the tracking error detection mode, the lower the ratio of the shortest mark length is, the less the amplitude of the tracking error signal becomes, thereby resulting in that the tracking servo is stable.

Normally, once a recoding encoding method is determined, a ratio of occurrences of each mark length in encoded data is substantially fixed. Therefore, it is difficult to decrease the ratio of occurrences of the shortest mark length of the prepit row 21 in the information signal region 11 in which encoded content information is recorded.

On the other hand, it is not necessary that information to be recorded in the form of the prepit row 22 in the test read region 12 be encoded information. Further, the prepit row 22 is formed for the purpose of obtaining an optimum value of a reproduction power value or the like value. On this account, if the prepit row 22 has all types of mark lengths that the prepit row 21 has, then it is possible to obtain an optimum value of the reproduction power value or the like value in conformity with an error rate and amplitude of a reproduction signal at the time of changing the reproduction power value or the like value.

As a result, by setting the ratio of occurrences of the shortest mark length on the prepit row 22 in the test read region 12 to be lower than that of the shortest mark length on the prepit row 21 of the information signal region 11, it is possible to make the tracking servo more stable in the prepit row 22 than in the prepit row 21, with respect to change in the reproduction power value or the like value.

Further, it is possible to stabilize the tracking servo only by changing a ratio of occurrences of a prepit 32 having the shortest mark length on the prepit row 22 in the test read region 12, without making a shape of the prepit 32 on the prepit row 22 in the test read region 12 different from a shape of a prepit 31 on the prepit row 21 in the information signal region 11. That is, it is possible to stabilize the tracking servo only by changing the arrangement of the prepit 32, without changing conditions (resist thickness, etc.) for forming a master plate for an optical information storage medium, i.e., an original based on which the substrate 2 is formed, at the time of forming the prepits 22 and 32, or changing write strategy. This makes it advantageously possible to restrain costs.

Furthermore, it is preferable that a ratio of occurrences of a longest mark length on the prepit row 22 in the test read region 12 be higher than a ratio of occurrences of a longest mark length on the prepit row 21 in the information signal region 11.

At this time, in a case where the tracking error detection mode of the playback apparatus 100 is the DPD mode, the ratio of occurrences of the longest mark length, which causes increase in amplitude of the tracking error signal relevant to stability of the tracking servo, is higher in the test read region 12 than in the information signal region 11. Therefore, the tracking servo becomes more stable in the test read region 12 than in the information signal region 11. This makes it possible to obtain optimum reproduction setting values by significantly changing the setting values.

This yields the effect of further improving the error rate and further widening a margin such as a defocus margin. Moreover, it is possible to prevent such a problem that contact of the pickup of the playback apparatus 100 with the super resolution medium 1 causes damage to the super resolution medium 1 so that information in the super resolution medium 1 cannot be reproduced again or causes malfunction of the pickup so that the playback apparatus 100 is rendered inoperable.

The following describes the reason why such a high ratio of occurrences of a longest mark length increases amplitude of the tracking error signal in the case where the playback apparatus 100 employs the DPD mode as the tracking error detection mode.

That is, amplitude of a reproduction signal of the longest mark length is greater than amplitude of reproduction signals of the other mark lengths. Therefore, as the ratio of occurrences of the longest mark length, i.e., the number of occurrences of the longest mark length on one track becomes higher, the amplitude of the tracking error signal becomes greater, thereby stabilizing the tracking servo.

Moreover, it is possible to stabilize the tracking servo only by changing a ratio of occurrences of a prepit 32 having the shortest mark length on the prepit row 22 in the test read region 12, without making a shape of the prepit 32 on the prepit row 22 in the test read region 12 different from a shape of a prepit 31 on the prepit row 21 in the information signal region 11. That is, the tracking servo can be stabilized only by changing the arrangement of the prepit 32, without changing mastering conditions (resist thickness, etc.) at the time of forming the prepits 31 and 32, or changing write strategy. This makes it advantageously possible to restrain costs.

Further, it is preferable that a pit depth Di of a prepit on the prepit row 21 and a pit dept Dt of a prepit on the prepit row 22 satisfy the following relationship:

$$Di/2 \leq Dt < Di$$

At this time, in a case where the playback apparatus 100 employs the push-pull mode as the tracking error detection mode, the tracking servo becomes more stable in the test read region 12 than in the information signal region 11 when amplitude of the tracking error signal relevant to stability of the tracking servo is greater in the test read region 12 than in the information signal region 11. This makes it possible to obtain optimum reproduction setting values by significantly changing the setting values.

This yields the effect of further improving the error rate and further widening a margin such as a defocus margin. Further, it is possible to prevent such a problem that contact of the pickup of the playback apparatus 100 with the super resolution medium 1 causes damage to the super resolution medium 1 so that information in the super resolution medium 1 cannot be reproduced again, or causes malfunction of the pickup so that the playback apparatus 100 is rendered inoperable.

Further, the depth of the prepit 32 on the prepit row 22 in the test read region 12 is less than the depth of the prepit 31 on the prepit row 21 in the information signal region 11. In this case, the prepits 31 and 32 can be more accurately transferred from a master plate to a stamper and then from the stamper to the substrate 2 so that the prepit rows 21 and 22 are formed on the substrate 2, as compared with a case where the depth of the prepit 32 on the prepit row 22 in the test region 12 is the same as the depth of the prepit 31 on the prepit row 21 in the information signal region 11. This makes it possible to decrease factors responsible for noise, such as uneven transfer that occurs at the time of transfer and burrs that are formed at the time of transfer. Consequently, it is possible to improve the error rate in the test read region 12 and to obtain optimum reproduction setting values more accurately.

Figure 5:
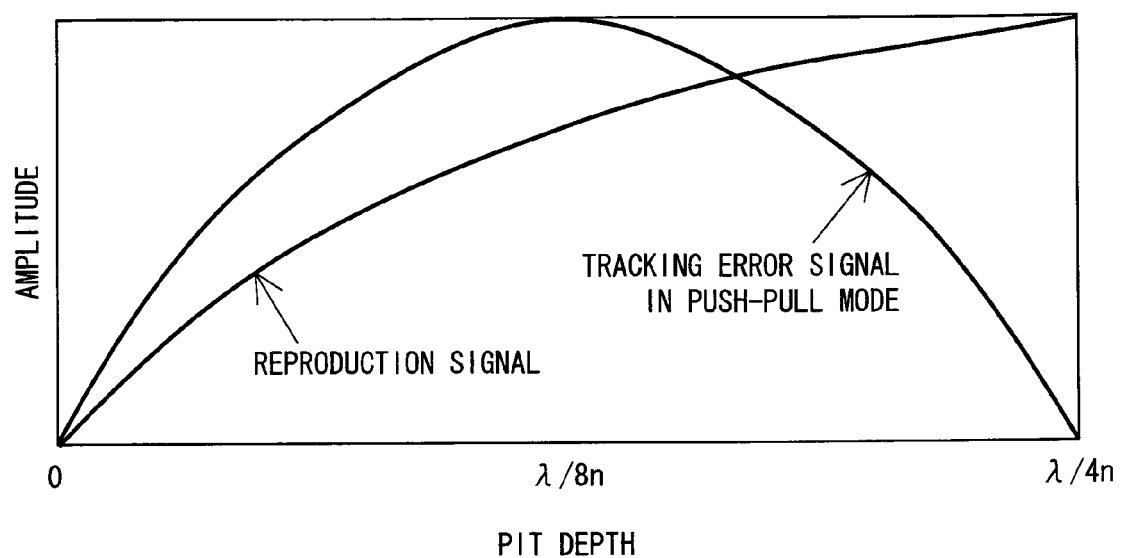
FIG. 5

With reference to FIG. 5, the following describes the reason why the amplitude of the tracking error signal relevant to stability of the tracing servo becomes greater in the test region 12 than in the information signal region 11 when the pit depth Di and the pit depth Dt satisfy the above relationship.

FIG. 5 is a graph showing amplitude of a reproduction signal and amplitude of a tracking error signal in the push-pull mode, relative to a pit depth.

The pit depth Di may be set to an arbitrary value as appropriate, as described above. However, it is preferable that the pit depth Di be set to about $\lambda/4n$ where $\lambda$ is a wavelength of reproduction laser light of the playback apparatus 100 and n is a refractivity of a material at a portion where light is diffracted. This is because, as shown in FIG. 5, light intensity, which varies depending on whether a pit is formed or not, reaches its peak at a pit depth of $\lambda/4n$, that is, amplitude of a reproduction signal reaches its peak at the pit depth of $\lambda/4n$.

For example, in a case of a commercially-available optical information storage medium, more particularly in a case of a read-only DVD, it is most important to increase recording density. For this reason, the standard of the read-only DVD is designed so that a pit is formed to have a depth of about 100 nm, i.e., $\lambda/4n$ at which a signal quality is best ($\lambda=650$ nm and a refractivity n of a substrate is 1.58).

In this regard, the super resolution medium 1 is also aimed at improving degree of informatization and therefore, the super resolution medium 1 is preferably such that the prepit depth Di of the information signal region 11 is substantially $\lambda/4n$, similarly to the read-only DVD.

However, as apparent from FIG. 5, when the pit depth is substantially $\lambda/4n$, a tracking error signal is substantially 0 in the case of the push-pull mode. This makes the tracking servo unstable.

In the test read region 12, it is important that the tracking servo works stably because a reproduction power value or the like is changed. In view of this, it is more important to increase the amplitude of the tracking error signal than to cause the largest amplitude of the reproduction signal. On this account, the prepit depth Dt in the test read region 12 is set to a value that substantially satisfy the following:

$$\lambda/8n \leq Dt < \lambda/4n$$

That is, the prepit depth Dt is set to a value that satisfy the following:

$$Di/2 \leq Dt < Di$$

When the prepit depth Dt is set to such a value, the amplitude of the reproduction signal in the test read region 12 is lower than that in the information signal region 11. However, the amplitude of the tracking error signal in the test read region 12 is greater than that in the information signal region 11, as shown in FIG. 5. This results in that the tracking servo is more stable in the test read region 12 than in the information signal region 11.

Even if a pit having the pit depth Dt is formed such that the pit depth Dt becomes deeper than the pit depth Di, the amplitude of the tracking error signal becomes high similarly to the case where the pit having the pit depth Dt is formed such that the pit depth Dt is less than the pit depth Di.

However, in general, in a case where a pit is formed deep, it becomes more difficult to form a master plate and to transfer the prepit rows 21 and 22 from the master plate to the substrate 2, as compared with a case where the pit is formed shallow. That is, the deeper the pit depth becomes, the more difficult the production of the substrate 2 becomes. For this reason, it is preferable that the pit having the pit depth Dt be formed such that the pit depth Dt is less than the pit depth Di.

Further, at the same amplitude of the tracking error signal, the amplitude of the reproduction signal is greater in a range where the pit depth Dt is not less than the pit depth Di/2 but less than the pit depth Di, than in a range where the pit depth Dt is less than a pit depth Di/2, as apparent from FIG. 5. In such a case where the amplitude of the tracking error signal is the same, one that gives greater amplitude of the reproduction signal is preferable in consideration of obtaining an optimum power value or the like value. On this account, it is preferable that the pit depth Dt be deeper than the pit depth Di/2.

Further, it is preferable that a track pitch TPt in the test read region 12, a pit width Wt on the prepit row 22, and a pit width Wi on the prepit row 21 satisfy the following relationship:

$$Wi < Wt \leq TPt/2$$

At this time, in a case where the playback apparatus 100 employs the push-pull mode as the tracking error detection mode, the tracking servo becomes more stable in the test read region 12 than in the information signal region 11 when amplitude of the tracking error signal relevant to stability of the tracking servo is greater in the test read region 12 than in the information signal region 11. This makes it possible to obtain optimum reproduction setting values by significantly changing the setting values.

This yields the effect of further improving the error rate and further widening a margin such as a defocus margin. Further, it is possible to prevent such a problems that contact of the pickup of the playback apparatus 100 with the super resolution medium 1 causes damage to the super resolution medium 1 so that information in the super resolution medium 1 cannot be reproduced again, or causes malfunction of the pickup so that the playback apparatus 100 is rendered inoperable.

Further, the pit width of the prepit 32 on the prepit row 22 in the test read region 12 is wider than the pit width of the prepit 31 on the prepit row 21 in the information signal region 11. In this case, the prepit rows 21 and 22 can be more accurately transferred from a master plate to a stamper and then from the stamper to the substrate 2 so that the prepit rows 21 and 22 are formed on the substrate 2, as compared with a case where the pit width of the prepit 32 on the prepit row 22 in the test region 12 is the same as the pit width of the prepit 31 on the prepit row 21 in the information signal region 11. This makes it possible to decrease factors responsible for noise, such as uneven transfer that occurs at the time of transfer and burrs that are formed at the time of transfer. Therefore, it is possible to improve the error rate in the test read region 12 and to obtain optimum reproduction setting values more accurately.

The following describes the reason why the amplitude of the tracking error signal relevant to stability of the tracing servo, becomes higher in the test read region 12 than in the information signal region 11, when the track pitch TPt, the pit width Wt, and the pit width Wi satisfy the above relationship.

A relationship between amplitude of a tracking error signal and a pit width in the case where the pull-push mode is employed as the tracking error detection mode was calculated by scholar diffraction calculation. The result was as follows: in a case where a pit length was infinite, the amplitude of the tracking error signal reached its peak at a pit width of Tp/2; and in a case where the pit length was shorter than a beam diameter, the amplitude of the tracking error signal reached its peak at a pit width larger than Tp/2. Further, it was demonstrated that as the pit width became less and less than Tp/2, the amplitude of the tracking error signal also became less. That is, the prepit row 21 in the information signal region 11 have various mark lengths and therefore an optimum pit width for the amplitude of the tracking error signal is uncertain. However, at least in a range where the pit width is less than Tp/2, the wider the pit width is, the greater the amplitude of the tracking error signal becomes.

Further, normally, the prepit width Wi in the information signal region 11 is less than TPi/2. This is because the formation of a pit having a wider width, such as a pit having the prepit width Wi of TPi/2, takes much expense in time and effort.

For example, in a case of a commercially-available optical information storage medium, more particularly in a case of a read-only CD, a pit width is 0.3 through 0.6 μm with respect to a track pitch of 1.60 μm. Further, in a case of a read-only DVD, a pit width is about 0.3 μm with respect to a track pitch of 0.74 μm. As such, the pit width is less than half the value of the track pitch.

Although the details will be described later, the track pitch TPt in the test read region 12 is preferably wider than the track pitch TPi in the information signal region 11. Therefore, the prepit width Wi in the information signal region 11 is less than TPt/2. On this account, the amplitude of the tracking error signal becomes high when the prepit width Wt in the test read region 12 satisfies the following:

$$Wi < Wt \leq TPt/2$$

This results in that the tracking servo becomes more stable in the test read region 12 than in the information signal region 11.

Furthermore, it is preferable that a wavelength λ of reproduction laser light of the playback apparatus 100, a numerical aperture NA of an objective lens of the playback apparatus 100, the track pitch TPt of the test read region 12, and the track pitch TPi of the information signal region 11 satisfy the following relationship:

$$TPi < TPt \leq \lambda/NA$$

In this case, when the amplitude of the tracking error signal relevant to stability of the tracking servo is greater in the test read region 12 than in the information signal region 11, the tracking servo becomes more stable in the test read region 12 than in the information signal region 11, regardless of whether the tracking error detection mode of the playback apparatus 100 is the DPD mode or the push-pull mode. As a result, it is possible to obtain optimum reproduction setting values by significantly changing the setting values.

This yields the effect of further improving the error rate and further widening a margin such as a defocus margin. Further, it is possible to prevent such a problem that contact of the pickup of the playback apparatus 100 with the super resolution medium 1 causes damage to the super resolution medium 1 so that information in the super resolution medium 1 cannot be reproduced again, or causes malfunction of the pickup so that the playback apparatus 100 is rendered inoperable.

Further, since the track pitch in the test read region 12 is wider than the track pitch in the information signal region 11, it is possible to reduce crosstalk of the reproduction signal in the test read region 12. If much crosstalk occurs, the amount of noise increases at signal reproduction, thereby worsening the error rate. In other words, with the above arrangement, it is possible to reduce noise, as compared to a case where the track pitch in the test read region 12 is the same as the track pitch in the information signal region 11. As a result, it is possible to improve the error rate in the test read region 12 and to obtain more reliable optimum reproduction setting values.

The following describes the reason why the amplitude of the tracking error signal relevant to stability of the tracking servo is greater in the test read region 12 than in the information signal region 11 when the numeral aperture NA, the track pitch TPt, and the track pitch TPi satisfy the above relationship.

Generally, a beam diameter of the reproduction laser light of the playback apparatus 100 is indicated by NA/λ.

When the track pitch is smaller than the beam diameter, i.e., NA/λ, the tracking error signal is interrupted by an adjacent track, regardless of whether the tracking error detection mode is the DPD mode or the push-pull mode. At this time, the smaller the track pitch is, the less the amplitude of the tracking error signal becomes.

On the other hand, when the track pitch is larger than the beam diameter, i.e., NA/λ, the tracking error signal is not interrupted by an adjacent track, regardless of whether the tracking error detection mode is the DPD mode or the push-pull mode. As a result, the amplitude of the tracking error signal is substantially constant, without depending on the track pitch. It should be noted that the larger the track pitch becomes, the more the recording density decreases.

On this account, when the track pitch TPt of the test read region 12 satisfies the following:

$$TPi < TPt \leq \lambda/NA$$

the amplitude of the tracking error signal relevant to stability of the tracking servo is greater in the test read region 12 than in the information signal region 11.

Moreover, when a track pitch in the lead-in area is represented by TP1, it is preferable that TP1<TPt be satisfied. The track pitch TPi in the information signal region 11 may be smaller than the track pitch TP1 of the lead-in area in view of high density. In this case, since the track pitch TPt in the test read region 12 is wider than the track pitch TP1 in the lead-in area, the tracking servo becomes more stable. As a result, it is possible to obtain optimum reproduction setting values by significantly changing the setting values. This can further improve the error rate and can further widen the margin such as a defocus margin.

Second Embodiment

Figure 6:
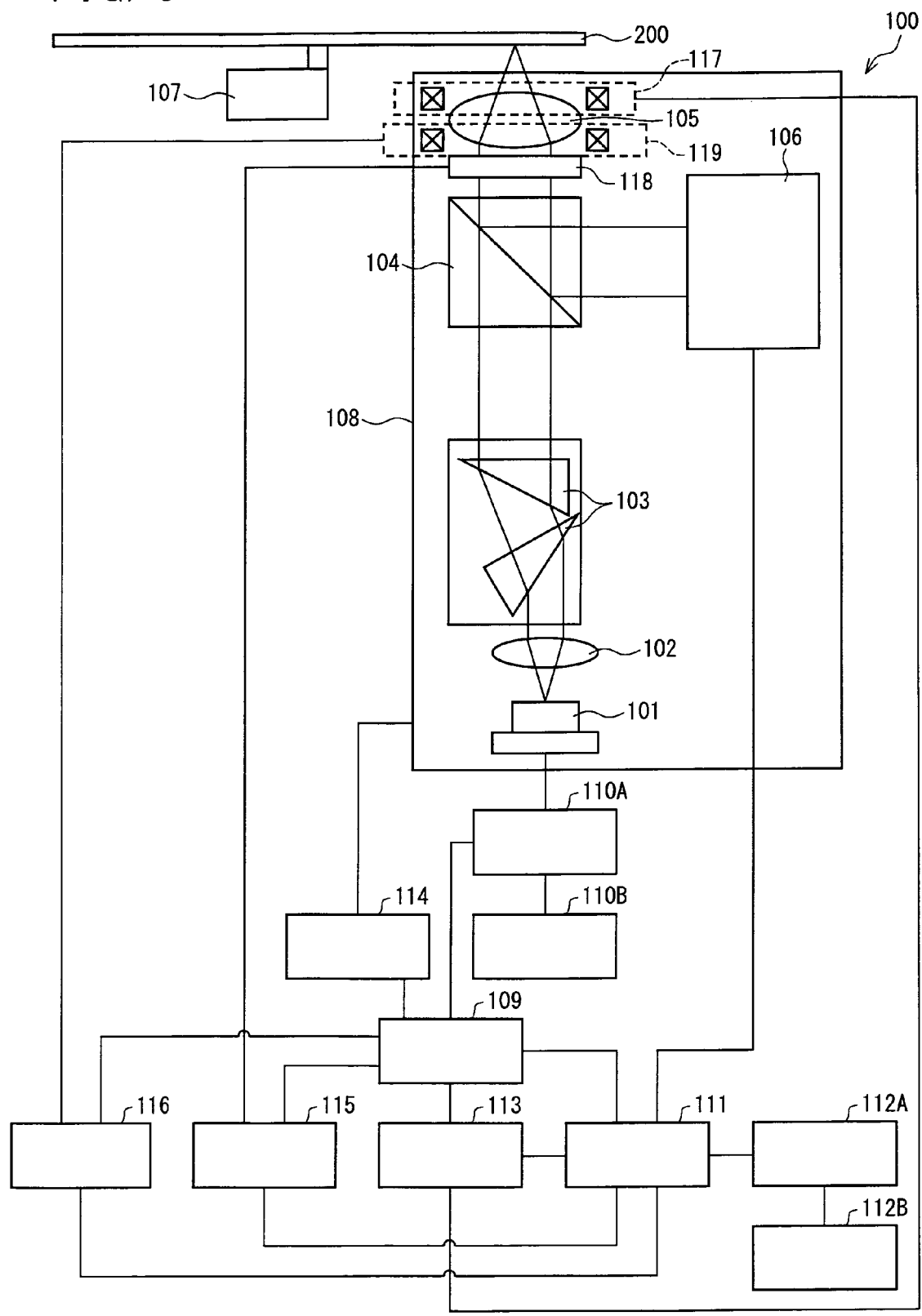
FIG. 6
Figure 7:
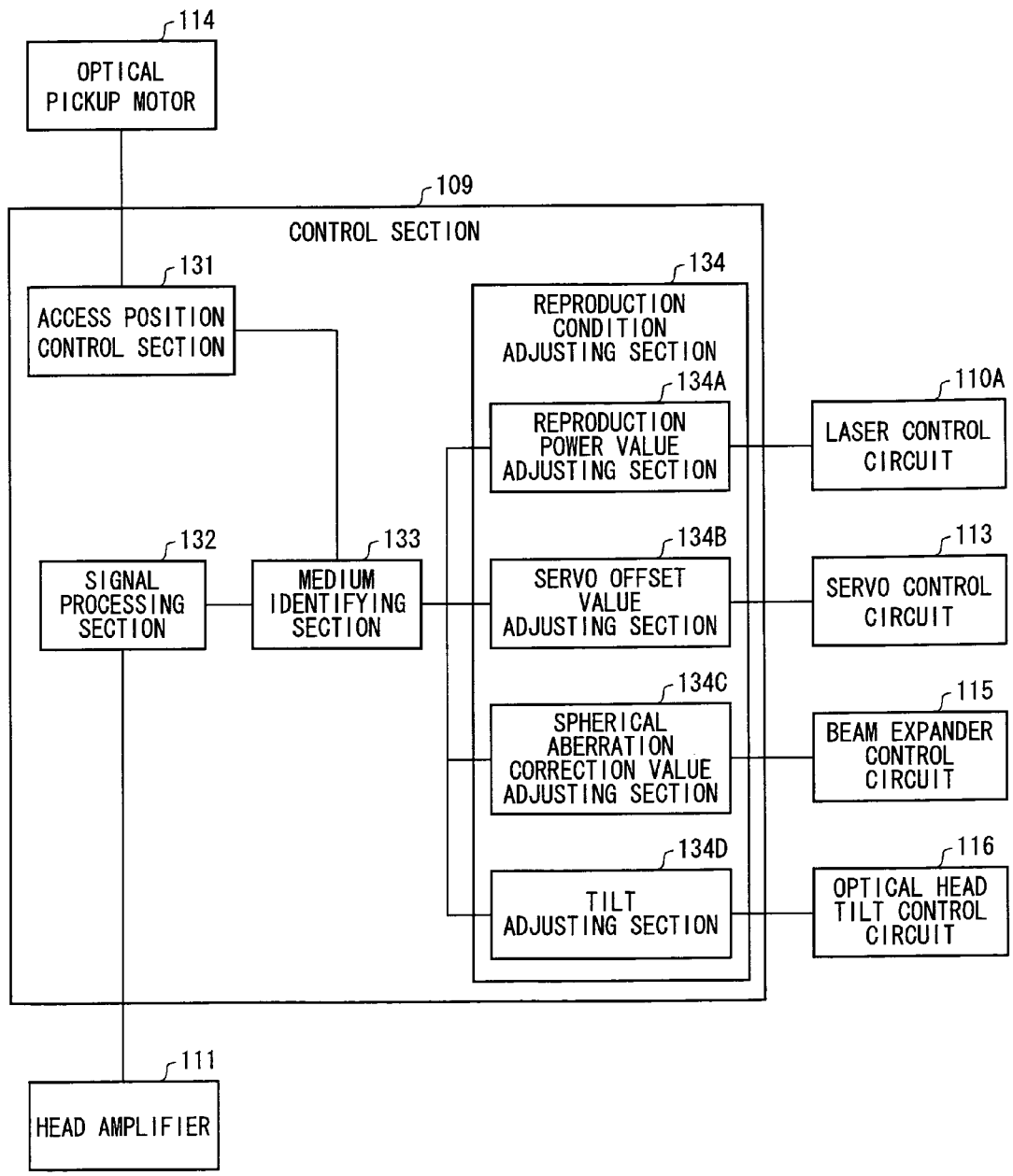
FIG. 7
Figure 8:
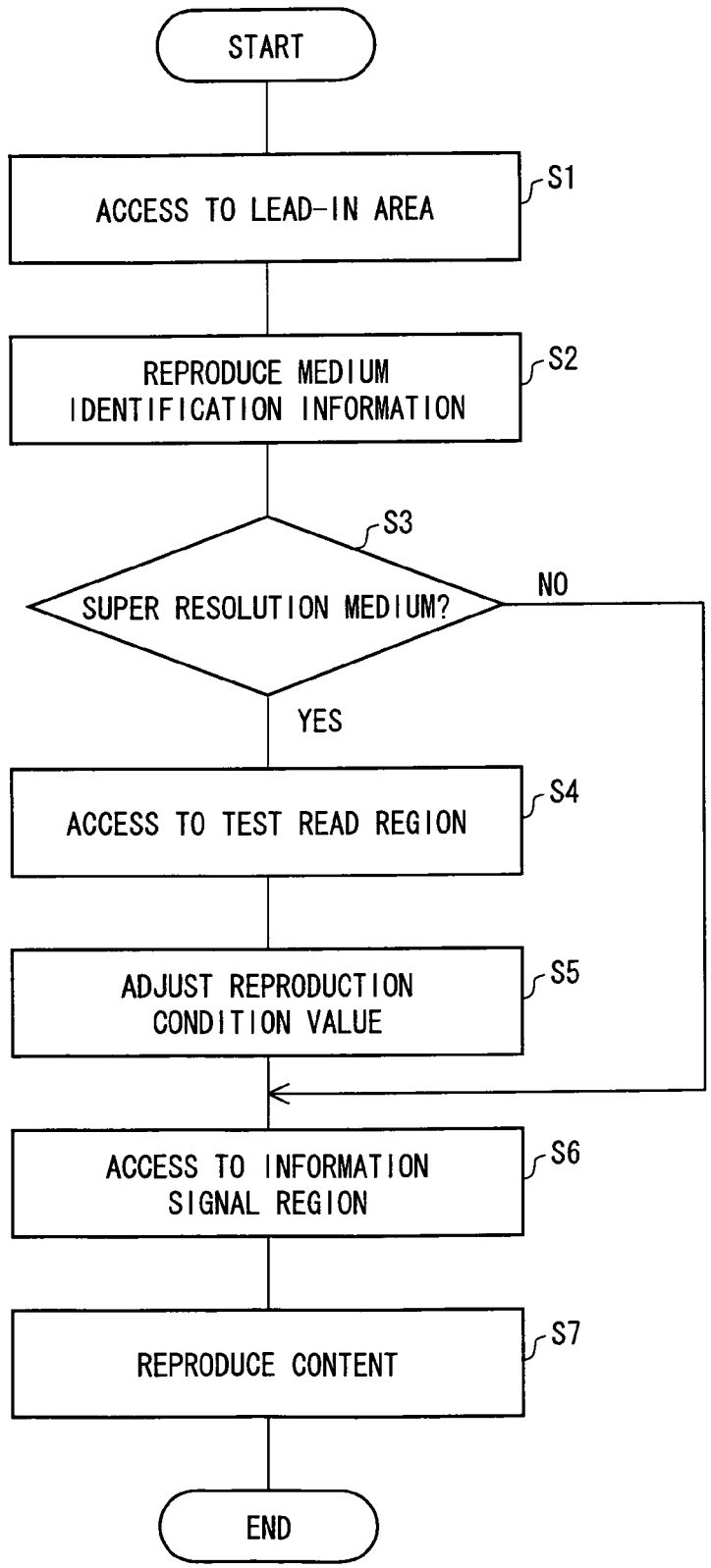
FIG. 8

The following will describe another embodiment of the present invention with reference to FIGS. 6 through 8.

FIG. 6 is a diagram schematically showing the configuration of an optical information storage medium playback apparatus according to the present embodiment.

A playback apparatus (optical information storage medium playback apparatus) 100 shown in FIG. 6 is a playback apparatus capable of reading the above-described super resolution medium 1 and normal medium.

The playback apparatus 100 is constituted by a spindle motor 107, an optical head (optical pickup, reproducing means) 108, a control section (control means) 109, a laser control circuit 110A, a signal processing circuit 110B, a head amplifier 111, an RF amplifier 112A, an RF signal processing circuit 112B, a servo processing circuit 113, an optical pickup motor 114, a beam expander control circuit 115, and an optical head tilt control circuit 116.

The optical head 108 includes a semiconductor laser 101, a collimator lens 102, a beam shaping prism 103, a beam splitter 104, an objective lens 105, an optical detector 106, an actuator 117, a beam expander 118, and a tilt adjusting system 119.

Note that, in the present embodiment, a wavelength λ of the semiconductor laser 101 is 405 nm, and a numerical aperture NA of the objective lens 105 is 0.85. However, values of the wavelength λ of the semiconductor laser 101 and the numerical aperture NA of the objective lens 105 are not limited to the above-described values and can be adjusted as appropriate according to a design of the playback apparatus 100. Further, an optical information storage medium 200 in FIG. 6 may be the super resolution medium 1 or the normal medium.

In the playback apparatus 100, the spindle motor 107 rotates the optical information storage medium 200, and the control section 109 controls the optical pickup motor 114 to move the optical head 108. Next, the laser control circuit 110A causes reproduction setting values of reproduction laser light emitted from the semiconductor laser 101 to be set to predetermined reproduction setting values (reproduction setting values for normal medium) so that the reproduction laser light is emitted from the semiconductor laser 101. At this time, a signal outputted from the laser control circuit 110A is fed to the signal processing circuit 110B so as to be subjected to signal processing in various kinds of ways.

The reproduction laser light emitted from the semiconductor laser 101 is converted by the collimator lens 102 into substantially parallel light. The substantially parallel light is shaped into light of a nearly circular light intensity distribution by the beam shaping prism 103, passes through the beam splitter 104, and then condensed onto the optical information storage medium 200 by the objective lens 105. Reflection light reflected off the optical information storage medium 200 is reflected by the beam splitter 104 and guided to the optical detector 106.

The optical detector 106 outputs an electrical signal according to change in direction of polarization of the reflection light that has reached the optical detector 106, change in intensity of the reflection light, and others. The electrical signal is amplified by the head amplifier 111 and then fed to the servo processing circuit 113, the beam expander control circuit 115, and the optical head tilt control circuit 116. Upon receipt of the electrical signal having been amplified by the head amplifier 111, the servo processing circuit 113 causes the actuator 117 to subject the objective lens 105 to various kinds of servo controls. The beam expander control circuit 115 causes the beam expander 118 to subject the optical head 108 to beam diameter adjustment. The optical head tilt control circuit 116 causes the tilt adjusting system 119 to subject the objective lens 105 to tilt adjustment. The electrical signal having been amplified by the head amplifier 111 is further fed to the control section 109.

FIG. 7 shows the configuration of the control section 109. As shown in FIG. 7, the control section 109 includes an access position control section 131, a signal processing section (identification information obtaining means) 132, a medium identifying section (medium identifying means) 133, and a reproduction condition adjusting section (reproduction condition adjusting means) 134.

The access position control section 131 controls the optical pickup motor 114 so that the optical head 108 can make access to a desired position on the optical information storage medium 200.

In a case where a region where medium identification information for identifying a medium is recorded is made up of a prepit row having a shortest mark length longer than the resolution limit of the playback apparatus 100, it is desirable that the access position control section 131 controls the optical pickup motor 114 on the basis of a result of identification of the optical information storage medium 200 by the medium identifying section 133. In the present embodiment, the medium identification information is recorded in the above-described lead-in area. That is, the medium identification information is recorded in the form of a prepit row having a shortest mark length longer than the resolution limit of the playback apparatus 100.

As in the super resolution medium disclosed in Patent Literature 2, it is preferable that recommended optimum reproduction setting values as well as the medium identification information be recorded in advance in the lead-in area. With this arrangement, the information recorded in the test read region 12 can be read out later with the optimum reproduction setting values. However, the recommended values can be omitted. Note that, in the present embodiment, it is assumed that the recommended values are additionally recorded in the lead-in area.

The signal processing section 132 processes a signal containing the medium identification information that has been transmitted from the head amplifier 111, and then provides the signal to the medium identifying section 133. The medium identifying section 133 identifies the optical information storage medium 200 on the basis of the signal having been provided from the signal processing section 132.

The reproduction condition adjusting section 134 adjusts the reproduction setting values on the basis of the result of the identification of the optical information storage medium 200 by the medium identifying section 133. In the present embodiment, the reproduction condition adjusting section 134 includes: a reproduction power value adjusting section 134A that transmits a signal indicative of adjustment of the reproduction power value to the laser control circuit 110A; a servo offset value adjusting section 134B that transmits a signal indicative of adjustment of the servo offset value to the servo processing circuit 113; a spherical aberration correction value adjusting section 134C that transmits a signal indicative of adjustment of the spherical aberration correction value to the beam expander control circuit 115; and a tilt adjusting section 134D that transmits a signal indicative of adjustment of the tilt to the optical head tilt control circuit 116.

Next, the operation of the playback apparatus 100 will be described with reference to FIG. 8. FIG. 8 shows the flow of the operation of the playback apparatus 100.

When the optical information storage medium 200 is loaded into the playback apparatus 100, the access position control section 131 of the control section 109 controls the optical pickup motor 114 so that the reproduction laser light emitted from the semiconductor laser 101 is directed into the lead-in area, which is a default access position at the playback of the optical information storage medium 200, with reproduction setting values for the normal medium, predetermined as default reproduction setting values (S1).

Then, the signal indicative of the medium identification information, which is recorded in the lead-in area, is reproduced (S2).

By way of the optical detector 106 and the head amplifier 111, the signal indicative of the medium identification information is processed by the signal processing section 132 of the control section 109, and the medium identifying section 133 then identifies the optical information storage medium 200 (S3).

If the optical information storage medium 200 has been identified as the normal medium as a result of the identification by the medium identifying section 133 (No in S3), the playback apparatus 100 makes access to the information signal region of the normal medium under the reproduction condition values for the normal medium (S6). Then, a content recorded in the information signal region is reproduced by way of the optical detector 106, the head amplifier 111, the RF amplifier 112A, and the RF signal processing circuit 112B (S7).

On the other hand, if the optical information storage medium 200 has been identified as the super resolution medium 1 as a result of the identification by the medium identifying section 133 (YES in S3), the optical pickup motor 114 is controlled by the access position control section 131 of the control section 109 so that reproduction setting values of the reproduction laser light emitted from the semiconductor laser 101 are set to the recommended optimum reproduction setting values recorded in the lead-in area.

Note that a method of setting the recommended values is not limited to the above method. That is, if the recommended values are not recorded in the lead-in area, the reproduction setting values (particularly, reproduction power value) may be set by using means that recognizes information on the reproduction setting values before the playback of the optical information storage medium 200 is started, after which the optical information storage medium 200 is rotated by the spindle motor 107. This is realized, for example, by the following method. That is, the reproduction setting values are set in such a manner that the playback apparatus 100 mechanically recognizes a cutout formed on part of the optical information storage medium 200 or part of a cartridge that protects the optical information storage medium 200.

The reproduction laser light whose reproduction setting values have been set to the recommended values is emitted from the semiconductor laser 101 and directed into the optical information storage medium 200, i.e. the test read region 12 of the super resolution medium 1 (S4). Then, the playback apparatus 100 reads the prepit 32 in the test read region 12 of the super resolution medium 1. A reproduction signal read off the prepit 32 is transmitted to the reproduction condition adjusting section 134 of the control section 109 by way of the optical detector 106, the head amplifier 111, and the signal processing section 132.

The reproduction condition adjusting section 134 adjusts the reproduction setting values to optimum values for the super resolution medium 1 on the basis of the reproduction signal (S5). Specifically, the reproduction power value adjusting section 134A controls the laser control circuit 110A on the basis of the reproduction signal to control intensity of laser light of the semiconductor laser 101, so that the reproduction power value is adjusted to an optimum value for the super resolution medium 1. The servo offset value adjusting section 134B controls the servo processing circuit 113 on the basis of the reproduction signal to control the actuator 117, so that the servo offset value is adjusted to an optimum value for the super resolution medium 1. The spherical aberration correction value adjusting section 134C controls the beam expander control circuit 115 on the basis of the reproduction signal to control the beam expander 118, so that the spherical aberration correction value is adjusted to an optimum value for the super resolution medium 1. The tilt adjusting section 134D controls the optical head tilt control circuit 116 on the basis of the reproduction signal to control the tilt adjusting system 119, so that the tilt is adjusted to an optimum value for the super resolution medium 1.

In order to obtain the optimum reproduction setting values for the super resolution medium 1 from the test read region 12, some methods can be adopted, including a method of changing the reproduction setting values so that the lowest error rate can be realized, and a method of changing the reproduction setting values so that all amplitudes of the reproduction signal in each mark length exceed a predetermined threshold value.

Thereafter, the playback apparatus 100 makes access to the information signal region 11 by means of reproduction laser light that takes optimum reproduction setting values for the super resolution medium 1 (S6). Then, the content in the information signal region 11 is reproduced by way of the optical detector 106, the head amplifier 111, the RF amplifier 112A, and the RF signal processing circuit 112B (S7).

If the optical information storage medium 200 has been identified as the normal medium as a result of identification by the medium identifying section 133 and the recommended optimum reproduction setting values have been recorded in advance in the normal medium, the playback apparatus 100 may cause the reproduction condition adjusting section 134 to adjust the reproduction setting values to the recommended values and then make access to the information signal region of the normal medium.

With this arrangement, reproduction setting values that vary due to mechanical deviation at the loading and operation, property variation of each playback apparatus, property variation of each super resolution medium, and the like factors, particularly an optimum reproduction power value, are obtained for each optical information storage medium from the test read region 12, after which the information signal region 11 where the content is recorded can be read.

This makes it possible to provide an optical information storage medium that realizes a low error rate and a wide margin, such as a defocus margin.

If property (e.g. error rate) of the super resolution medium has changed due to mechanical deviation of the super resolution medium 1 or other factors during reading of the information signal region 11, optimum values for the reproduction power value and other values may be obtained again from the test read region 12, after which the information signal region 11 is read.

This makes it possible to again make better the property of the super resolution medium that has been deteriorated due to the mechanical deviation or other factors during playback thereof and to again increase a margin, such as a defocus margin.

The configuration of an optical information storage medium playback apparatus according to the present invention is not limited to the configuration according to the present embodiment. That is, an optical information storage medium playback apparatus according to the present invention may be an optical information storage medium playback apparatus that is characterized by, at the playback of the super resolution medium 1, obtaining the optimum reproduction setting values from the test read region 12 and then reading the information signal region 11.

Further, the optical information storage medium playback apparatus includes not only a read-only or write-only apparatus but also an apparatus capable of reading and writing, and the optical information storage medium playback apparatus may be of either stationary or portable use.

Finally, each block of the control section 109 of the playback apparatus 100 may be constituted by hardware logic or may be realized by software by means of a CPU as described below.

That is, the playback apparatus 100 includes a CPU (central processing unit) that executes the order of a control program for realizing the aforesaid functions, ROM (read only memory) that stores the control program, RAM (random access memory) that develops the control program in executable form, and a storage device (storage medium), such as memory, that stores the control program and various types of data therein. With this arrangement, the object of the present invention is realized by a predetermined storage medium. The storage medium stores, in computer-readable manner, program codes (executable code program, intermediate code program, and source program) of the control program of the control section 109 of the playback apparatus 100, which is software for realizing the aforesaid functions. The storage medium is provided to the playback apparatus 100. With this arrangement, the playback apparatus 100 (alternatively, CPU or MPU) as a computer reads out and executes program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the playback apparatus 100 may be arranged so as to be connectable to a communications network so that the program code is supplied to the playback apparatus 100 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

Still further, examples of the optical information storage medium include optically-readable disks such as CD-ROM (Compact Disk Read Only Memory), CD-R, CD-RW, DVD-ROM (Digital Versatile Disk Read Only Memory), DVD-RW (Digital Versatile Disk Rewritable), BD, and BD-ROM, and various kinds of optical disks such as a magneto-optical disk and a phase-change type disk. In the present invention, the optical information storage medium may be written by any scheme and may be of any size.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

INDUSTRIAL APPLICABILITY

An optical information storage medium of the present invention can be used suitably for, for example, an optical information storage medium that performs information processing by super resolution reproduction.

The invention claimed is:

1. An optical information storage medium where information is recorded in a form of prepits each made up of at least either a concavity or a convexity, and the information is reproduced by irradiating light to the prepits in an optical information storage medium playback apparatus,
the optical information storage medium comprising:
an information signal region where a content is recorded; and
a test read region where reproduction setting value adjustment information is recorded for adjusting a setting value for the reproduction performed by the optical information storage medium playback apparatus, wherein:
the information signal region has a first prepit row which is made up of a plurality of prepits, and a shortest mark length on the first prepit row is shorter than a length of an optical system resolution limit of the optical information storage medium playback apparatus;
the test read region has a second prepit row which is made up of a plurality of prepits for the adjustment, and types of mark lengths on the second prepit row are the same as all types of mark lengths on the first prepit row;
the second prepit row includes a prepit having a mark length shorter than the length of the optical system resolution limit of the optical information storage medium playback apparatus; and
each of the first and second prepit rows has each have at least three types of mark lengths, wherein a ratio of prepits having the shortest mark length to total number of prepits on the second prepit row is lower than a ratio of prepits having the shortest mark length to total number of prepits on the first prepit row.

2. The optical information storage medium according to claim 1, wherein amplitude of a tracking error signal in the test read region is greater than amplitude of a tracking error signal in the information signal region.

3. The optical information storage medium according to claim 1, wherein $TPi<TPt\leqq\lambda/NA$ is satisfied, where represents a wavelength of reproduction laser light of the optical information storage medium playback apparatus, NA represents a numerical aperture of an objective lens of the optical information storage medium playback apparatus, TPi represents a track pitch in the information signal region, and TPt represents a track pitch in the test read region.

4. An optical information storage medium where information is recorded in a form of prepits each made up of at least either a concavity or a convexity, and the information is reproduced by irradiating light to the prepits in an optical information storage medium playback apparatus,
the optical information storage medium comprising:
an information signal region where a content is recorded; and
a test read region where reproduction setting value adjustment information is recorded for adjusting a setting value for the reproduction performed by the optical information storage medium playback apparatus, wherein:
the information signal region has a first prepit row which is made up of a plurality of prepits, and a shortest mark length on the first prepit row is shorter than a length of an optical system resolution limit of the optical information storage medium playback apparatus;
the test read region has a second prepit row which is made up of a plurality of prepits for the adjustment, and types of mark lengths on the second prepit row are the same as all types of mark lengths on the first prepit row;
the second prepit row includes a prepit having a mark length shorter than the length of the optical system resolution limit of the optical information storage medium playback apparatus; and
each of the first and second prepit rows has each have at least three types of mark lengths,
wherein a ratio of prepits having a longest mark length to total number of prepits on the second prepit row is higher than a ratio of prepits having the longest mark length to total number of prepits on the first prepit row.

5. An optical information storage medium where information is recorded in a form of prepits each made up of at least either a concavity or a convexity, and the information is reproduced by irradiating light to the prepits in an optical information storage medium playback apparatus,
the optical information storage medium comprising:
an information signal region where a content is recorded; and
a test read region where reproduction setting value adjustment information is recorded for adjusting a setting value for the reproduction performed by the optical information storage medium playback apparatus, wherein:
the information signal region has a first prepit row which is made up of a plurality of prepits, and a shortest mark length on the first prepit row is shorter than a length of an optical system resolution limit of the optical information storage medium playback apparatus;
the test read region has a second prepit row which is made up of a plurality of prepits for the adjustment, and types of mark lengths on the second prepit row are the same as all types of mark lengths on the first prepit row;
the second prepit row includes a prepit having a mark length shorter than the length of the optical system resolution limit of the optical information storage medium playback apparatus; and
each of the first and second prepit rows has each have at least three types of mark lengths,
wherein $Di/2\leqq Dt<Di$ is satisfied, where Di represents a depth of a prepit on the first prepit row and Dt represents a depth of a prepit on the second prepit row.

6. An optical information storage medium where information is recorded in a form of prepits each made up of at least either a concavity or a convexity, and the information is reproduced by irradiating light to the prepits in an optical information storage medium playback apparatus,
the optical information storage medium comprising:
an information signal region where a content is recorded; and
a test read region where reproduction setting value adjustment information is recorded for adjusting a setting value for the reproduction performed by the optical information storage medium playback apparatus, wherein:
the information signal region has a first prepit row which is made up of a plurality of prepits, and a shortest mark length on the first prepit row is shorter than a length of an optical system resolution limit of the optical information storage medium playback apparatus;
the test read region has a second prepit row which is made up of a plurality of prepits for the adjustment, and types of mark lengths on the second prepit row are the same as all types of mark lengths on the first prepit row;
the second prepit row includes a prepit having a mark length shorter than the length of the optical system resolution limit of the optical information storage medium playback apparatus; and
each of the first and second prepit rows has each have at least three types of mark lengths,
wherein $Wi<Wt\leqq TPt/2$ is satisfied, where TPt represents the track pitch in the test read region, Wi represents a pit width of a prepit on the first prepit row, and Wt represents a pit width of a prepit on the second prepit row.

7. An optical information storage medium playback apparatus capable of reading an optical information storage medium where information is recorded in a form of prepits each made up of at least either a concavity or a convexity, and the information is reproduced by irradiating light to the prepits in an optical information storage medium playback apparatus, the optical information storage medium including: an information signal region where a content is recorded; and a test read region where reproduction setting value adjustment information is recorded for adjusting a setting value for the reproduction performed by the optical information storage medium playback apparatus, wherein: the information signal region has a first prepit row which is made up of a plurality of prepits, and a shortest mark length on the first prepit row is shorter than a length of an optical system resolution limit of the optical information storage medium playback apparatus; the test read region has a second prepit row which is made up of a plurality of prepits for the adjustment, and types of mark lengths on the second prepit row is the same as all types of mark lengths on the first prepit row; the second prepit row includes a prepit having a mark length shorter than the length of the optical system resolution limit of the optical information storage medium playback apparatus; and the first and second prepit rows each have at least three types of mark lengths, the optical information storage medium playback apparatus comprising:

reproducing means for reproducing information recorded at a desired position in the optical information storage medium; and control means for obtaining an optimum setting value on a basis of a reproduction signal that has been read off a prepit of the test read region in the optical information storage medium by the reproducing means, and then for controlling the reproducing means in accordance with the optimum setting value, wherein a ratio of prepits having the shortest mark length to total number of prepits on the second prepit row is lower than a ratio of prepits having the shortest mark length to total number of prepits on the first prepit row.

8. A method of controlling an optical information storage medium playback apparatus capable of reading an optical information storage medium where information is recorded in a form of prepits each made up of at least either a concavity or a convexity, and the information is reproduced by irradiating light to the prepits in an optical information storage medium playback apparatus, the optical information storage medium including: an information signal region where a content is recorded; and a test read region where reproduction setting value adjustment information is recorded for adjusting a setting value for the reproduction performed by the optical information storage medium playback apparatus, wherein: the information signal region has a first prepit row which is made up of a plurality of prepits, and a shortest mark length on the first prepit row is shorter than a length of an optical system resolution limit of the optical information storage medium playback apparatus; the test read region has a second prepit row which is made up of a plurality of prepits for the adjustment, and types of mark lengths on the second prepit row is the same as all types of mark lengths on the first prepit row; the second prepit row includes a prepit having a mark length shorter than the length of the optical system resolution limit of the optical information storage medium playback apparatus; and the first and second prepit rows each have at least three types of mark lengths, the method comprising:

a reproduction step of reproducing information recorded at a desired position in the optical information storage medium; and a control step of obtaining an optimum setting value on a basis of a reproduction signal that has been read off a prepit of the test read region in the optical information storage medium in the reproduction step, and then controlling the reproduction in the reproduction step in accordance with the optimum setting value, wherein a ratio of prepits having the shortest mark length to total number of prepits on the second prepit row is lower than a ratio of prepits having the shortest mark length to total number of prepits on the first prepit row.

\* \* \* \* \*